US012676306B2

(12) United States Patent
Takamori

(10) Patent No.: US 12,676,306 B2
(45) Date of Patent: Jul. 7, 2026

(54) LITHIUM METAL COMPOSITE OXIDE, POSITIVE ELECTRODE ACTIVE MATERIAL FOR LITHIUM SECONDARY BATTERIES, POSITIVE ELECTRODE AND LITHIUM SECONDARY BATTERY

(71) Applicant: Sumitomo Metal Mining Co., Ltd., Tokyo (JP)

(72) Inventor: Kenji Takamori, Fukui (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 915 days.

(21) Appl. No.: 17/296,887

(22) PCT Filed: Oct. 15, 2019

(86) PCT No.: PCT/JP2019/040433
§ 371 (c)(1),
(2) Date: May 25, 2021

(87) PCT Pub. No.: WO2020/110486
PCT Pub. Date: Jun. 4, 2020

(65) Prior Publication Data
US 2022/0029158 A1    Jan. 27, 2022

(30) Foreign Application Priority Data
Nov. 30, 2018    (JP) ................................. 2018-225443

(51) Int. Cl.
H01M 4/525 (2010.01)
H01M 4/505 (2010.01)
(Continued)

(52) U.S. Cl.
CPC .......... H01M 4/525 (2013.01); H01M 4/505 (2013.01); H01M 10/0525 (2013.01); *H01M 2004/021* (2013.01); *H01M 2004/028* (2013.01)

(58) Field of Classification Search
CPC .. H01M 4/525; H01M 4/505; H01M 10/0525; H01M 2004/021; H01M 2004/028
See application file for complete search history.

(56) References Cited

U.S. PATENT DOCUMENTS

| | | | | |
|---|---|---|---|---|
| 8,980,125 B2 * | 3/2015 | Endoh | .................... | H01M 4/139 |
| | | | | 429/231.95 |
| 11,114,670 B2 * | 9/2021 | Lee | ........................ | H01M 4/364 |

(Continued)

FOREIGN PATENT DOCUMENTS

| | | |
|---|---|---|
| JP | 2008-186753 A | 8/2008 |
| JP | 2010-262826 A | 11/2010 |

(Continued)

OTHER PUBLICATIONS

Chinese Office Action issued in corresponding Chinese Patent Application No. 201980077808.0, Sep. 29, 2022, with English translation.

(Continued)

*Primary Examiner* — Holly Rickman
(74) *Attorney, Agent, or Firm* — RIMON P.C.

(57)    ABSTRACT
A lithium metal composite oxide composed of secondary particles that are aggregates of primary particles, and single particles that exist independently from the secondary particles, wherein the lithium metal composite oxide is represented by a compositional formula (1) shown below, $$Li[Li_x(Ni_{(1-y-z-w)}Co_yMn_zM_w)_{1-x}]O_2 \qquad (1)$$

(Continued)

wherein M is at least one element selected from the group consisting of Fe, Cu, Ti, Mg, Al, W, B, Mo, Nb, Zn, Sn, Zr, Ga and V, $-0.1 \leq x \leq 0.2$, $0 < y \leq 0.4$, $0 \leq z \leq 0.4$ and $0 \leq w \leq 0.1$.

12 Claims, 4 Drawing Sheets

(51) Int. Cl.
H01M 10/0525 (2010.01)
*H01M 4/02* (2006.01)

(56) References Cited

U.S. PATENT DOCUMENTS

| | | | |
|---|---|---|---|
| 2002/0009645 A1 | 1/2002 | Shima et al. | |
| 2010/0209763 A1* | 8/2010 | Okamura | H01M 4/139 |
| | | | 429/223 |
| 2010/0285366 A1 | 11/2010 | Endoh | |
| 2013/0164623 A1 | 6/2013 | Saka et al. | |
| 2017/0012288 A1 | 1/2017 | Yamaji et al. | |
| 2017/0125796 A1 | 5/2017 | Kamiyama et al. | |
| 2017/0155139 A1 | 6/2017 | Feng et al. | |
| 2017/0288221 A1 | 10/2017 | Kobayashi et al. | |
| 2017/0288223 A1 | 10/2017 | Ogawa et al. | |
| 2019/0330072 A1 | 10/2019 | Manari et al. | |
| 2020/0020931 A1 | 1/2020 | Kurita et al. | |
| 2020/0052295 A1 | 2/2020 | Koshika et al. | |

FOREIGN PATENT DOCUMENTS

| | | | |
|---|---|---|---|
| JP | 2012-074357 | A | 4/2012 |
| JP | 2017-188443 | A | 10/2017 |
| JP | 2017-188445 | A | 10/2017 |
| JP | 2018-063920 | A | 4/2018 |
| JP | 2018-095523 | A | 6/2018 |
| JP | 2018-174106 | A | 11/2018 |
| KR | 10-1853836 | B1 | 6/2018 |
| WO | 2005/020354 | A1 | 3/2005 |
| WO | 2015/097950 | A1 | 7/2015 |
| WO | 2015/115547 | A1 | 8/2015 |
| WO | 2016/002158 | A1 | 1/2016 |
| WO | 2016/006557 | A1 | 1/2016 |
| WO | 2016/129361 | A1 | 8/2016 |
| WO | 2018/079809 | A1 | 5/2018 |
| WO | 2018/110256 | A1 | 6/2018 |

OTHER PUBLICATIONS

International Search Report issued in corresponding Internaitonal Patent Application No. PCT/JP2019/040433, dated Jan. 7, 2020, with English translation.
Japanese Notice of Reasons for Refusal issued in corresponding Japanese Patent Application No. 2018-225443, dated May 14, 2019, with English translation.
Extended European Search Report issued in corresponding European Patent Application No. 19889133.5-1108, dated Aug. 18, 2022.
Korean Office Action issued in corresponding Korean Patent Application No. 10-2021-7015852, Sep. 19, 2023 with English translation.

\* cited by examiner

LITHIUM METAL COMPOSITE OXIDE, POSITIVE ELECTRODE ACTIVE MATERIAL FOR LITHIUM SECONDARY BATTERIES, POSITIVE ELECTRODE AND LITHIUM SECONDARY BATTERY

CROSS REFERENCE TO RELATED APPLICATIONS

This application is the U.S. National Phase under 35 U.S.C. § 371 of International Application No. PCT/JP2019/040433, filed on Oct. 15, 2019, which claims the benefit of Japanese Application No. 2018-225443, filed on Nov. 30, 2018, the entire contents of each are hereby incorporated by reference.

TECHNICAL FIELD

The present invention relates to a lithium metal composite oxide, a positive electrode active material for lithium secondary batteries, a positive electrode and a lithium secondary battery.

BACKGROUND ART

Lithium metal composite oxides are used as the positive electrode active material for lithium secondary batteries. Lithium secondary batteries are not only already widely used for small power supplies for mobile telephone applications and laptop computer applications and the like, but are also increasingly being used for medium or large power supplies for vehicle applications and electricity storage applications and the like.

The particle shape of the lithium metal composite oxide has an effect on the filling properties and the like during pressing when used to form a positive electrode active material.

For example, Patent Document 1 discloses a positive electrode active material for lithium secondary batteries having secondary particles with an average circularity of at least 0.05 but not more than 0.6. The Patent Document 1 discloses that by ensuring the circularity of the secondary particles falls within the above range, the contact between the secondary particles and the conductive auxiliary agent can be improved, and high-output charging and discharging becomes possible. Patent Document 1 discloses that an average circularity of 1 means that the positive electrode active material is spherical (perfectly spherical), and that as the average circularity gets smaller, the shape of the positive electrode active material shifts further away from a spherical shape.

PRIOR ART LITERATURE

Patent Document

Patent Document 1: JP 2008-186753 A

SUMMARY OF INVENTION

Problems to be Solved by the Invention

Among positive electrode active materials for lithium secondary batteries such as those disclosed in Patent Document 1, there remains room for improvement in terms of increasing volumetric capacity and improving volumetric capacity retention.

The present invention has an object of providing a lithium metal composite oxide, a positive electrode active material for lithium secondary batteries, a positive electrode and a lithium secondary battery that exhibit superior volumetric capacity and volumetric capacity retention.

Means for Solving the Problems

In other words, the present invention includes the following inventions [1] to [9].

[1] A lithium metal composite oxide composed of secondary particles that are aggregates of primary particles, and single particles that exist independently from the secondary particles, wherein the lithium metal composite oxide is represented by a compositional formula (1) shown below, and satisfies requirements (A), (B) and (C) described below.

$$Li[Li_x(Ni_{(1-y-z-w)}Co_yMn_zM_w)_{1-x}]O_2 \quad (1)$$

(wherein M is at least one element selected from the group consisting of Fe, Cu, Ti, Mg, Al, W, B, Mo, Nb, Zn, Sn, Zr, Ga and V, $-0.1 \leq x \leq 0.2$, $0 < y \leq 0.4$, $0 \leq z \leq 0.4$ and $0 \leq w \leq 0.1$)

(A) The BET specific surface area of the lithium metal composite oxide is less than 2 $m^2/g$.

(B) The lithium metal composite oxide has at least two peaks in a number-based circularity distribution of the circularity determined using a formula (2) shown below.

$$Circularity = 4\pi S/L^2 \quad (2)$$

(wherein S is the projected surface area in a projected image of a particle that constitutes the powder of the metal composite oxide, and L is the circumference of the particle)

(C) The average particle size $D_{50}$ of the lithium metal composite oxide is at least 2 μm but not more than 20 μm.

[2] The lithium metal composite oxide according to [1], wherein the average circularity is at least 0.4 but not more than 0.8.

[3] The lithium metal composite oxide according to [1] or [2], wherein the circularity distribution has a first peak within a circularity range in which the circularity is at least 0.4 but not more than 0.7, and has a second peak within a circularity range in which the circularity is at least 0.75 but not more than 0.95.

[4] The lithium metal composite oxide according to [3], wherein in the circularity distribution, the circularity distribution standard deviation is at least 0.1 but not more than 0.4.

[5] The lithium metal composite oxide according to [3] or [4], wherein the first peak is a peak attributable to single particles, and the second peak is a peak attributable to secondary particles.

[6] The lithium metal composite oxide according to any one of [1] to [5], comprising single particles with an average particle size of at least 1.0 μm but not more than 5.0 μm.

[7] A positive electrode active material for a lithium secondary battery, the active material comprising the lithium metal composite oxide according to any one of [1] to [6].

[8] A positive electrode having the positive electrode active material for a lithium secondary battery according to [7].

[9] A lithium secondary battery having the positive electrode according to [8].

Effects of the Invention

The present invention is able to provide a lithium metal composite oxide, a positive electrode active material for lithium secondary batteries, a positive electrode and a lithium secondary battery that exhibit superior volumetric capacity and volumetric capacity retention.

EMBODIMENTS FOR CARRYING OUT THE INVENTION

Figure 1A:
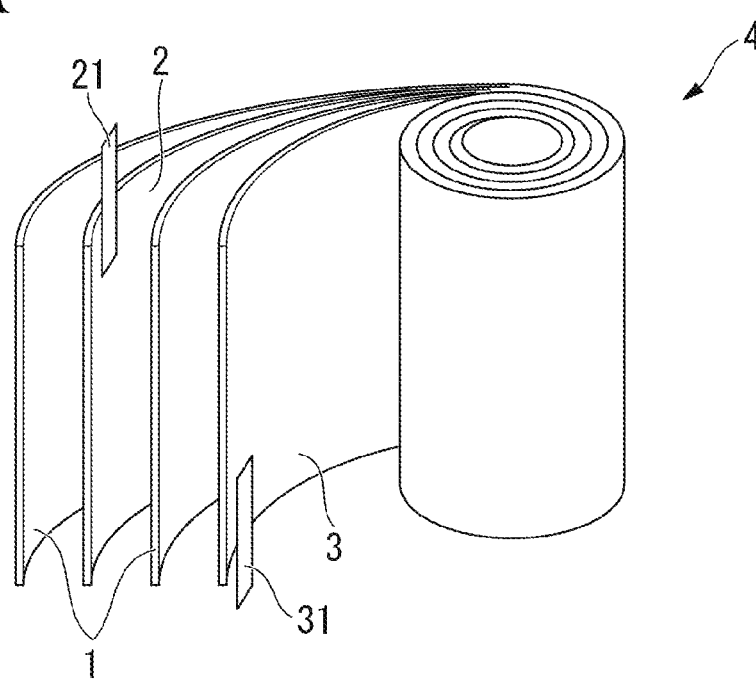
FIG. 1A is a schematic structural diagram illustrating one example of a lithium ion secondary battery.

In the present invention, the term "primary particle" means a particle which constitutes part of a secondary particle, and for which no grain boundaries exist in the external appearance when observed in a visual field at a magnification of 5,000× to 20,000× using a scanning electron microscope or the like, and means, for example, a particle with an average particle size of less than 0.5 μm.

In the present invention, the term "secondary particle" means a particle composed of aggregated primary particles.

In the present invention, the term "single particle" means a particle which exists independently from the secondary particles, and for which no grain boundaries exist in the external appearance when observed in a visual field at a magnification of 5,000× to 20,000× using a scanning electron microscope or the like, and means, for example, a particle with an average particle size of at least 0.5 μm.

In the present invention, when the term "particle" is used, the meaning includes either one or both of a single particle and a secondary particle.

<Lithium Metal Composite Oxide>

One embodiment of the present invention is a lithium metal composite oxide composed of secondary particles that are aggregates of primary particles, and single particles that exist independently from the secondary particles.

The lithium metal composite oxide of the present embodiment is represented by a compositional formula (1) shown below, and satisfies requirements (A), (B) and (C) described below.

$$Li[Li_x(Ni_{(1-y-z-w)}Co_yMn_zM_w)_{1-x}]O_2 \tag{1}$$

(wherein M is at least one element selected from the group consisting of Fe, Cu, Ti, Mg, Al, W, B, Mo, Nb, Zn, Sn, Zr, Ga and V, $-0.1 \leq x \leq 0.2$, $0 < y \leq 0.4$, $0 \leq z \leq 0.4$ and $0 \leq w \leq 0.1$)

(A) The BET specific surface area of the lithium metal composite oxide is less than 2 m²/g.

(B) The lithium metal composite oxide has at least two peaks in a number-based circularity distribution of the circularity determined using a formula (2) shown below.

$$Circularity = 4\pi S/L^2 \tag{2}$$

(wherein S is the projected surface area in a projected image of a particle that constitutes the powder of the metal composite oxide, and L is the circumference of the particle)

(C) The average particle size $D_{50}$ of the lithium metal composite oxide is at least 2 μm but not more than 20 μm.

Compositional Formula (1)

The lithium metal composite oxide of the present embodiment is represented by the compositional formula (1) shown below.

$$Li[Li_x(Ni_{(1-y-z-w)}Co_yMn_zM_w)_{1-x}]O_2 \tag{1}$$

(wherein M is at least one element selected from the group consisting of Fe, Cu, Ti, Mg, Al, W, B, Mo, Nb, Zn, Sn, Zr, Ga, La and V, $-0.1 \leq x \leq 0.2$, $0 < y \leq 0.4$, $0 \leq z \leq 0.4$ and $0 \leq w \leq 0.1$)

From the viewpoint of obtaining a lithium secondary battery with high cycle characteristics, x in the above compositional formula (1) preferably exceeds 0, is more preferably at least 0.01, and even more preferably 0.02 or greater. Further, from the viewpoint of obtaining a lithium secondary battery having a higher initial coulombic efficiency, x in the compositional formula (1) is preferably not more than 0.1, more preferably not more than 0.08, and even more preferably 0.06 or less.

The upper limit and lower limit for x may be combined as desired.

For example, in the present embodiment, it is preferable that $0 < x \leq 0.1$, more preferable that $0.01 \leq x \leq 0.08$, and even more preferable that $0.02 \leq x \leq 0.06$.

In embodiments of the present invention, the expression "high cycle characteristics" means the reduction in the battery capacity upon repeated charging and discharging is low, meaning the ratio of the capacity following repeated charging and discharging relative to the initial capacity is less likely to decrease.

Further, from the viewpoint of obtaining a lithium secondary battery having low battery internal resistance, y in the above compositional formula (1) preferably exceeds 0, is more preferably at least 0.005, even more preferably at least 0.01, and particularly preferably 0.05 or greater. Furthermore, from the viewpoint of obtaining a lithium secondary battery with high thermal stability, y in the above compositional formula (1) is more preferably not more than 0.35, and even more preferably 0.33 or less.

The upper limit and lower limit for y may be combined as desired.

In the present embodiment, it is preferable that $0 < y \leq 0.4$, more preferable that $0.005 \leq y \leq 0.35$, and even more preferable that $0.01 \leq y \leq 0.33$.

In the present embodiment, it is particularly preferable that, in the compositional formula (1), $0 < x \leq 0.1$ and $0 < y \leq 0.4$.

Furthermore, from the viewpoint of obtaining a lithium secondary battery with high cycle characteristics, z in the above compositional formula (1) is preferably at least 0.01, more preferably at least 0.02, and even more preferably 0.1 or greater. Further, from the viewpoint of obtaining a lithium secondary battery having superior storage properties at high temperatures (for example, in an environment at 60° C.), z in the compositional formula (1) is preferably not more than 0.39, more preferably not more than 0.38, and even more preferably 0.35 or less.

The upper limit and lower limit for z may be combined as desired. For example, it is preferable that $0.01 \leq z \leq 0.39$, more preferable that $0.02 \leq z \leq 0.38$, and even more preferable that $0.02 \leq z \leq 0.35$.

Further, from the viewpoint of obtaining a lithium secondary battery having low battery internal resistance, w in the above compositional formula (1) preferably exceeds 0, is more preferably at least 0.0005, and even more preferably at least 0.001. Furthermore, from the viewpoint of obtaining a lithium secondary battery having a large discharge capacity at a high current rate, w in the above compositional formula (1) is preferably not more than 0.09, more preferably not more than 0.08, and even more preferably 0.07 or less.

The upper limit and lower limit for w may be combined as desired. For example, it is preferable that $0 < w \leq 0.09$, more preferable that $0.0005 \leq w \leq 0.09$, even more preferable that $0.001 \leq w \leq 0.08$, and still more preferably that $0.001 \leq w \leq 0.07$.

From the viewpoint of obtaining a lithium secondary battery with a large battery capacity, in the present embodiment, the value of y+z+w in the compositional formula (1) is preferably less than 0.5, more preferably not more than 0.48, and even more preferably 0.46 or less. Further, in the present embodiment, the value of y+z+w in the compositional formula (1) preferably exceeds 0.

M in the compositional formula (1) is at least one element selected from the group consisting of Fe, Cu, Ti, Mg, Al, W, B, Mo, Nb, Zn, Sn, Zr, Ga, La and V.

From the viewpoint of obtaining a lithium secondary battery with high cycle characteristics, M in the compositional formula (1) is preferably at least one element selected from the group consisting of Ti, Mg, Al, W, B and Zr, and is more preferably at least one element selected from the group consisting of Al and Zr. Furthermore, from the viewpoint of obtaining a lithium secondary battery with high thermal stability, at least one element selected from the group consisting of Ti, Al, W, B and Zr is preferred.

Condition (A)

The lithium metal composite oxide of the present embodiment of the present invention has a BET specific surface area that is less than 2 m²/g, preferably not more than 1.7 m²/g, more preferably not more than 1.5 m²/g, and particularly preferably 1.4 m²/g or less.

In the present embodiment, the BET specific surface area is defined as the value (units: m²/g) obtained by drying 1 g of the lithium metal composite oxide under a nitrogen atmosphere at 105° C. for 30 minutes, and then conducting a measurement with a BET specific surface area analyzer (for example, Macsorb (a registered trademark) manufactured by Mountech Co., Ltd.).

It is surmised that by ensuring the BET specific surface area of the lithium metal composite oxide of the present embodiment is not more than the above upper limit, the volumetric capacity and the volumetric capacity retention can be improved.

Although there are no particular limitations on the lower limit for the BET specific surface area of the lithium metal composite oxide of the present embodiment, an example of a typical lower limit is 0.2 m²/g.

The lithium metal composite oxide of the present embodiment has a BET specific surface area that is less than 2 m²/g, preferably at least 0.2 m²/g but not more than 1.7 m²/g, more preferably at least 0.3 m²/g but not more than 1.5 m²/g, and particularly preferably at least 0.4 m²/g but not more than 1.4 m²/g.

Condition (B)

The lithium metal composite oxide of the present embodiment has at least two peaks in the circularity distribution. It is surmised that by ensuring the lithium metal composite oxide of the present embodiment has at least two peaks in the circularity distribution, the volumetric capacity and the volumetric capacity retention can be improved.

—Measurement of Circularity Distribution

The circularity distribution of the lithium metal composite oxide that represents the measurement target is measured. The circularity distribution in the present embodiment is a number-based circularity distribution of the circularity determined using the formula (2) shown below.

First, an SEM image of the lithium metal composite oxide is acquired, and a particle image that is a projected image of the particles that constitute the lithium metal composite oxide is obtained. Next, the circularity, which is calculated using the formula (2) shown below, is measured for the individual particles (namely, the secondary particles and single particles) that constitute the lithium metal composite oxide. In the formula (2) below, the circumference of a particle means the length around the outer periphery of the particle in the projected image. At this time, the number of particles for which the circularity is measured may be any number of 50 or more, and in this description, for example, 50 particles are measured. A circularity distribution for the lithium metal composite oxide is obtained by plotting the circularity obtained along the horizontal axis and the number of particles along the vertical axis. For the circularity represented by the following formula (2), a numerical value closer to 1 means a particle shape closer to a true circle.

$$\text{Circularity} = 4\pi S/L^2 \qquad (2)$$

(S is the projected surface area of the particle in the projected image, and L is the circumference of the particle.)

Examples of methods for obtaining the circularity distribution include methods in which image analysis is conducted using an image acquired using a scanning electron microscope (SEM) or a transmission electron microscope (TEM) or the like, and methods that use a commercially available particle image analyzer, and particularly a flow-type particle image analyzer.

The lithium metal composite oxide of the present embodiment has at least two peaks in the circularity distribution obtained using the method described above. Here, the term "peak" means describes a location, in the circularity distribution obtained by plotting the circularity obtained along the horizontal axis and the number of particles along the vertical axis with the range from a circularity of 0 to 1.0 divided into 20 data ranges having equal intervals of 0.05, where the number of particles changes from an increasing trend to a decreasing trend when moving from a low circularity toward a higher circularity.

In the evaluation of the circularity distribution, the range from a circularity of 0 to 1.0 may also be divided into 20 or more data ranges.

In the present embodiment, the circularity distribution measurement is preferably conducted a plurality of times to confirm that the peaks appear with good reproducibility. Further, those locations for which reproducibility cannot be obtained may be adjudged to be attributable to noise, and are not treated as peaks.

From the viewpoint of enhancing the volumetric capacity and the volumetric capacity retention, the average circularity of the lithium metal composite oxide of the present embodiment is preferably at least 0.4 but not more than 0.8, more preferably at least 0.45 but not more than 0.75, and particularly preferably at least 0.48 but not more than 0.70. The average circularity can be calculated by dividing the sum of the circularity values for all of the measured particles by the total number of measured particles.

In the present embodiment, from the viewpoint of enhancing the volumetric capacity and the volumetric capacity retention, the circularity distribution with the circularity along the horizontal axis and the number of particles along the vertical axis preferably has a first peak within a circularity range in which the circularity is at least 0.4 but not more than 0.7, and a second peak within a circularity range in which the circularity is at least 0.75 but not more than 0.95.

In the present embodiment, from the viewpoint of increasing the volumetric capacity, the circularity distribution standard deviation in the circularity distribution for the lithium metal composite oxide is preferably at least 0.1, more preferably at least 0.15, and even more preferably 0.18 or greater. Further, from the viewpoint of improving the handling properties of the lithium metal composite oxide, the circularity distribution standard deviation is preferably not more than 0.4, more preferably not more than 0.35, and even more preferably 0.30 or less. In other words, the circularity distribution standard deviation for the lithium metal composite oxide is preferably at least 0.1 but not more than 0.4, more preferably at least 0.15 but not more than 0.35, and even more preferably at least 0.18 but not more than 0.30.

In the present embodiment, it is preferable that the first peak is a peak attributable to single particles, and the second peak is a peak attributable to secondary particles. The lithium metal composite oxide of the present embodiment is composed of secondary particles and single particles. The secondary particles are composed of aggregated primary particles, and therefore have a particle shape that is close to spherical. Accordingly, of the peaks observed in the circularity distribution, the second peak may sometimes be a peak attributable to secondary particles. Further, the first peak may sometimes be a peak attributable to single particles composed of other constituent components. The particles that give rise to the first peak and the second peak may be determined from the image acquired when calculating the circularity of each particle.

Figure 2A:
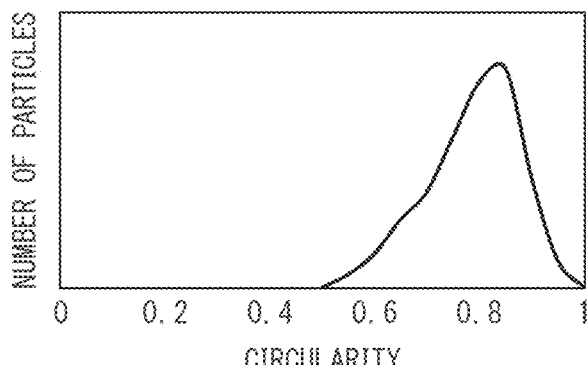
FIG. 2A is a graph illustrating an example of the circularity distribution of a lithium metal composite oxide containing only secondary particles.
Figure 2B:
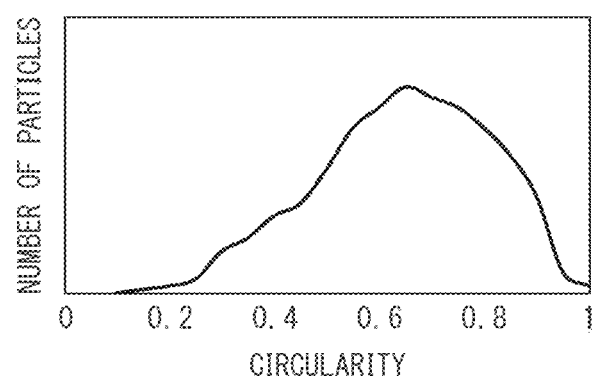
FIG. 2B is a graph illustrating an example of the circularity distribution of a lithium metal composite oxide containing only single particles.
Figure 2C:
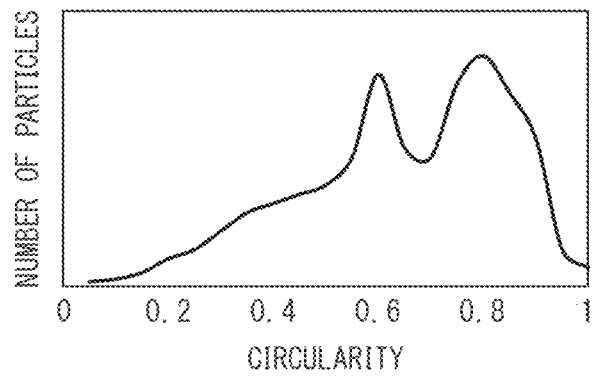
FIG. 2C is a graph illustrating an example of the circularity distribution of a lithium metal composite oxide of an embodiment of the present invention.

FIG. 2A to FIG. 2C illustrate the circularity distributions of lithium metal composite oxides having different states of existence for the particles.

FIG. 2A is a graph illustrating one example of the circularity distribution of a lithium metal composite oxide containing only secondary particles.

FIG. 2B is a graph illustrating one example of the circularity distribution of a lithium metal composite oxide containing only single particles.

FIG. 2C is a graph illustrating one example of the circularity distribution of a lithium metal composite oxide of an embodiment of the present invention.

As illustrated in FIG. 2A, a lithium metal composite oxide containing only secondary particles may sometimes have a peak where the circularity is within a range from 0.8 to 0.9. Secondary particles are particles composed of aggregated primary particles, and a majority of secondary particles are spherical. As a result, in the case of a lithium metal composite oxide containing only secondary particles, as illustrated in FIG. 2A, a single peak may sometimes be observed at a high circularity.

There is a possibility that a lithium metal composite oxide containing only secondary particles may also contain a small amount of primary particles produced by breakage of the secondary particles, but it is thought that because the abundance of these primary particles is extremely low, a peak attributable to these primary particles is not observed.

As illustrated in FIG. 2B, in the circularity distribution of a lithium composite metal oxide containing only single particles, a sharp peak is sometimes not observed, with an overall broad peak appearing. It is thought that this is because in the case of single particles, the well-developed crystal planes can appear more clearly at the particle surface.

FIG. 2C illustrates one example of the circularity distribution of a lithium metal composite oxide of an embodiment of the present invention. When the lithium metal composite oxide is composed of secondary particles that are aggregates of primary particles, and single particles that exist independently from the secondary particles, a first peak attributable to the single particles and a second peak attributable to the secondary particles are sometimes observed.

In an embodiment of the present invention, the circularity distribution should have at least two peaks, but may also have three or more peaks. In those cases where the lithium metal composite oxide contains particles having different particle shapes (for example, elliptical particles, plate-like particles or fibrous particles), a plurality of peaks attributable to the different circularities of the various particles may be observed.

In the lithium metal composite oxide of an embodiment of the present invention, the abundance ratio between the single particles and the secondary particles is preferably set so that the abundance ratio of single particles relative to secondary particles is within a range from (1 to 60)/(99 to 40). In other words, the abundance ratio of single particles: secondary particles is preferably within a range from 1/99 to 60/40. The abundance ratio represents the mass ratio between the particles. In other words, the abundance ratio may be the ratio between the total mass of single particles and the total mass of secondary particles contained in the lithium metal composite oxide, but may also be the ratio between the total mass of single particles and the total mass of secondary particles in a prescribed amount of the lithium metal composite oxide that has been randomly sampled from the lithium metal composite oxide.

Condition (C)

From the viewpoint of enhancing the volumetric capacity and the volumetric capacity retention of the lithium metal composite oxide of the present embodiment, the average particle size $D_{50}$ is typically at least 2 μm but not more than 20 μm, preferably at least 3 μm but not more than 18 μm, and more preferably at least 4 μm but not more than 15 μm.

In the lithium metal composite oxide of an embodiment of the present invention, from the viewpoint of enhancing the volumetric capacity and the volumetric capacity retention, the average particle size of the single particles is preferably at least 1 μm, more preferably at least 1.1 μm, and even more preferably 1.2 μm or greater.

Further, there are no particular limitations on the upper limit for the average particle size of the single particles. In one example, the average particle size of the single particles may be not more than 5.0 μm or not more than 4.0 μm, or may be 3.0 μm or less.

For example, the average particle size of the single particles is preferably at least 1 μm but not more than 5.0 μm, more preferably at least 1.1 μm but not more than 4.0 μm, and even more preferably at least 1.2 μm but not more than 3.0 μm.

—Average Particle Sizes of Single Particles and Secondary Particles

First, the lithium metal composite oxide is placed on a conductive sheet affixed to a sample stage, and using a JSM-5510 manufactured by JEOL Ltd., an electron beam with an accelerating voltage of 20 kV is irradiated onto the lithium metal composite oxide to conduct an SEM observation. Fifty single particles or secondary particles are extracted randomly from the image (SEM photograph) obtained in the SEM observation, and for each single particle or secondary particle, the distance (directed diameter) between parallel lines that sandwich the projected image of the single particle or secondary particle between parallel lines drawn in a prescribed direction is measured as the particle size of the single particle or secondary particle. The arithmetic mean of the obtained particle sizes of the single particles or secondary particles is deemed the average single particle size or average secondary particle size of the lithium metal composite oxide. The n number used for calculating the average particle size is set to 50 or greater.

—Average Particle Size $D_{50}$

This value is measured by the laser diffraction/scattering method. First, 0.1 g of the lithium metal composite oxide powder is added to 50 ml of a 0.2% by mass aqueous solution of sodium hexametaphosphate to obtain a dispersion having the powder dispersed therein.

Subsequently, using a laser diffraction/scattering particle size distribution analyzer (for example, Microtrac MT3300EXII manufactured by MicrotracBEL Corporation), the particle size distribution of the obtained dispersion is measured, and a volume-based cumulative particle size distribution curve is obtained.

In the obtained cumulative particle size distribution curve, the particle size at the point where the cumulative volume reaches 50% from the small particle side is $D_{50}$ (μm).

(Layered Structure)

In the present embodiment, the crystal structure of the lithium metal composite oxide is a layered structure, and is preferably a hexagonal crystal structure or a monoclinic crystal structure.

The hexagonal crystal structure belongs to one space group selected from the group consisting of P3, $P3_1$, $P3_2$, R3, P-3, R-3, P312, P321, $P3_1$12, $P3_1$21, $P3_2$12, $P3_2$21, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3$/m, P622, $P6_1$22, $P6_5$22, $P6_2$22, $P6_4$22, $P6_3$22, P6mm, P6cc, $P6_3$cm, $P6_3$mc, P-6m2, P-6c2, P-62m, P-62c, P6/mmm, P6/mcc, $P6_3$/mcm and $P6_3$/mmc.

Further, the monoclinic crystal structure belongs to one space group selected from the group consisting of P2, $P2_1$, C2, Pm, Pc, Cm, Cc, P2/m, $P2_1$/m, C2/m, P2/c, $P2_1$/c and C2/c.

Among these, in order to obtain a lithium secondary battery having a high discharge capacity, it is particularly preferable that the crystal structure is a hexagonal crystal structure belonging to the space group R-3m, or a monoclinic crystal structure belonging to C2/m.

Figure 3:
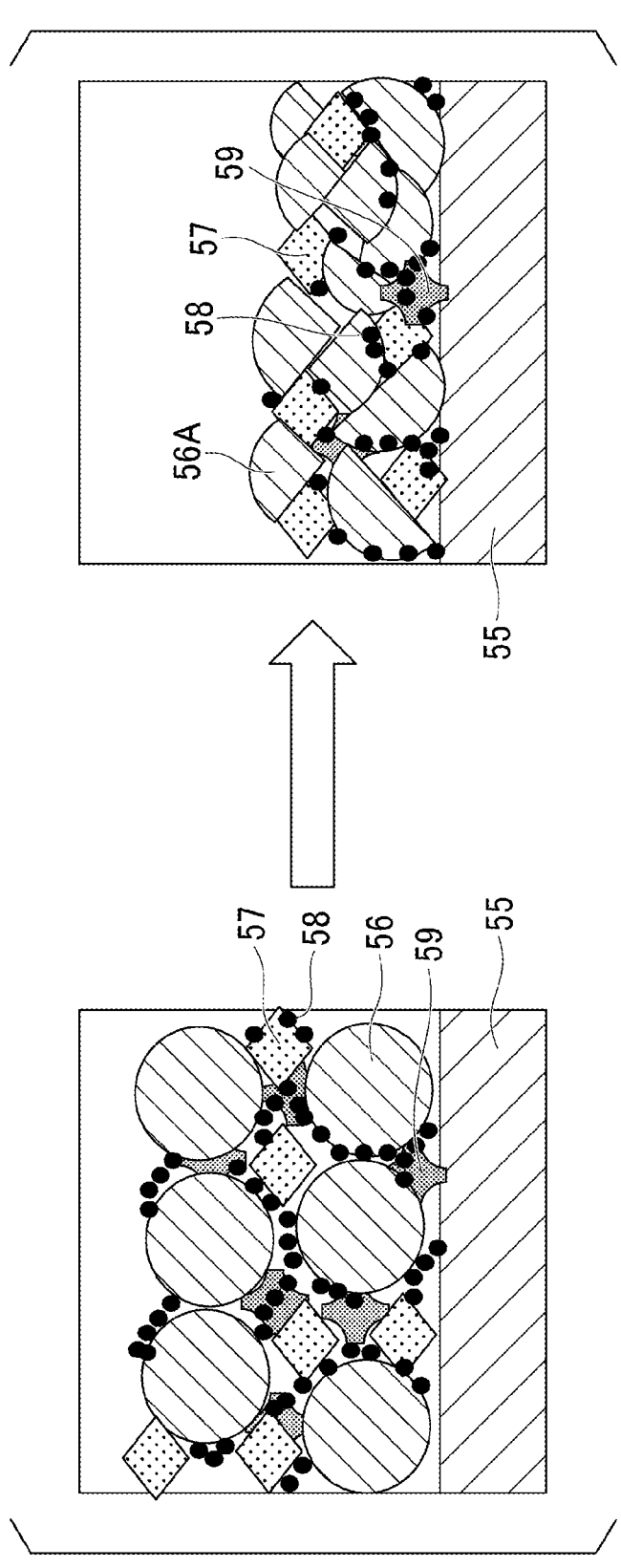
FIG. 3 is a schematic illustration for explaining the actions and effects when an embodiment of the present invention is applied.
Figure 4:
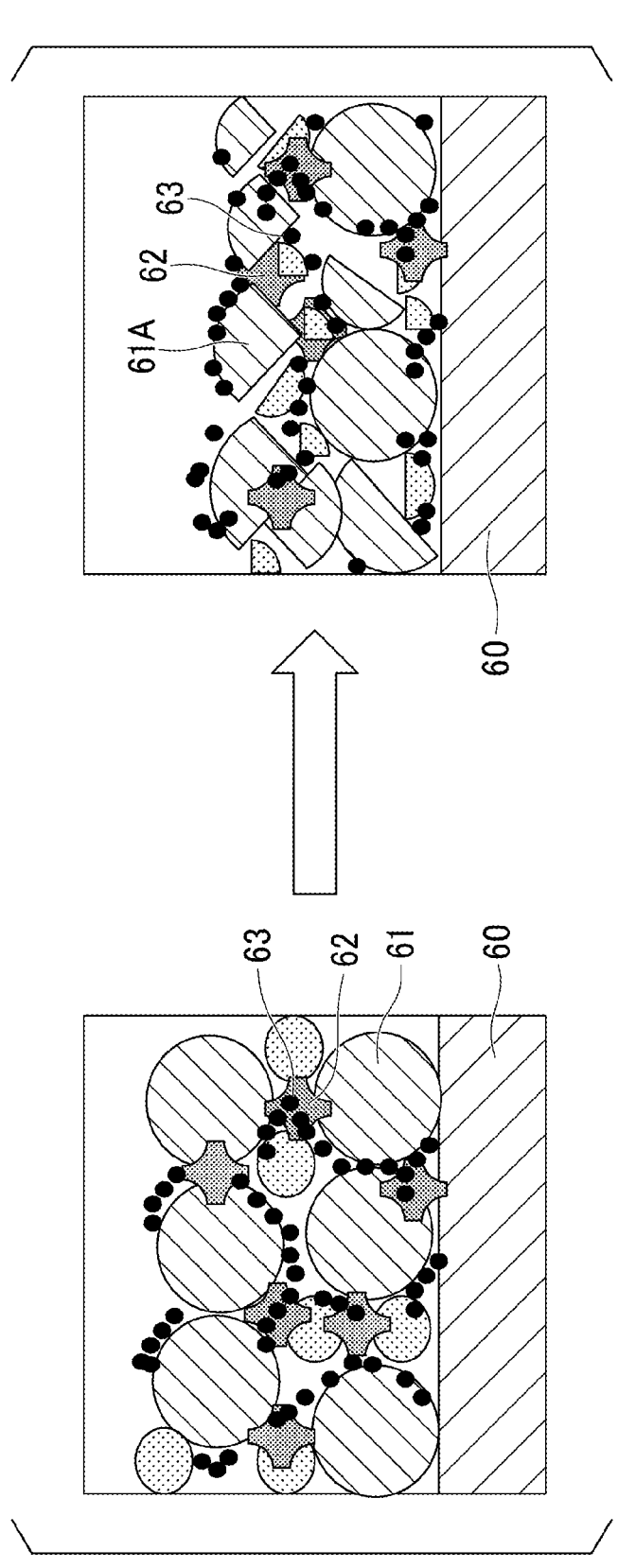
FIG. 4 is a schematic illustration for explaining the actions and effects when an embodiment of the present invention is not applied.

When the lithium metal composite oxide of an embodiment of the present invention is used as the positive electrode active material in the production of an electrode, the electrode density can be increased. A schematic illustration of the case where the lithium metal composite oxide of the present embodiment is press-filled is shown in FIG. 3. In FIG. 3 and FIG. 4, the particles of high circularity represent secondary particles, and the particles of low circularity represent single particles. FIG. 3 illustrates a state in which a positive electrode mixture containing secondary particles 56, single particles 57, a conductive agent 58 and a binder 59 has been applied to a collector 55. When the positive electrode mixture is pressed and affixed to the collector, the applied pressure generates friction between the secondary particles 56 and the single particles 57, and breakage of the secondary particles 56 occurs, producing broken secondary particles (symbol 56A). Under the applied pressure, the broken secondary particles 56A and the single particles 57 move and realign so as to fill the voids. In other words, it is surmised that the single particles 57 move into the spaces between the broken secondary particles 56A, thereby increasing the contact surface area between the secondary particles (symbols 56A and 56) and the single particles 57, and reducing voids. It is thought that this improves the density of the electrode.

Furthermore, it is thought that the existence of the single particles 57 increases the friction with the secondary particles 56, thereby promoting particle breakage. In addition, it is thought that because the single particles 57 and the particles produced by breakage of the secondary particles 56 have low circularity, even when particle movement and realignment occur upon pressurization, voids of a certain size or smaller will still remain. Accordingly, it is thought that when a battery is produced and the battery is subjected repeated charging and discharging, depletion of the electrolyte solution and the like is less likely to occur. As a result of this type of action, it is thought that the lithium metal composite oxide of the present embodiment containing secondary particles and single particles exhibits improved volumetric capacity and volumetric capacity retention.

In contrast, the case where a lithium metal composite oxide powder containing no single particles, but rather having only secondary particles, is used as a positive electrode active material in the production of an electrode is illustrated in FIG. 4. FIG. 4 illustrates a state in which a positive electrode mixture containing secondary particles 61, a binder 62 and a conductive agent 63 has been applied to a collector 60. When the positive electrode mixture is pressed and affixed to the collector, in those cases where broken secondary particles 61A and unbroken secondary particles 61 exist, it is thought that movement and realignment of the particles under applied pressure does not proceed sufficiently, resulting in the generation of gaps in the structure. It is thought that when an embodiment of the present invention is not applied, these gaps cannot be filled, meaning the density of the electrode cannot be increased.

<Method for Producing Lithium Metal Composite Oxide>

The lithium metal composite oxide according to an embodiment of the present invention can be produced using a production method 1 or production method 2 described below.

Production Method 1

When producing the lithium metal composite oxide of an embodiment of the present invention, it is preferable to first prepare a metal composite compound containing the metals other than lithium, namely, containing at least Ni, and also containing at least one optional element selected from the group consisting of Co, Mn, Fe, Cu, Ti, Mg, Al, W, B, Mo, Nb, Zn, Sn, Zr, Ga, La and V, and subsequently fire this metal composite compound with an appropriate lithium salt and an inert flux. An optional element is an element that may be incorporated into the composite metal compound as desired, and in some cases the optional element may not be included in the composite metal compound. The metal composite compound is preferably a metal composite hydroxide or a metal composite oxide. One example of a method for producing the lithium metal composite oxide is described below, with the method divided into a metal composite compound production step and a lithium metal composite oxide production step.

(Metal Composite Compound Production Step)

The metal composite compound can be produced using a commonly known batch coprecipitation method or continuous coprecipitation method. This production method is described below in detail using the example of a metal composite hydroxide containing nickel, cobalt and manganese as metals.

In the production method 1, in the metal composite compound production step, a metal composite compound that eventually forms the single particles, and a metal composite compound that forms the secondary particles are each produced. In the following description, the metal composite compound that eventually forms the single particles is sometimes referred to as the "single particles precursor". Further, the metal composite compound that eventually forms the secondary particles is sometimes referred to as the "secondary particles precursor".

First, the coprecipitation method, and in particular the continuous method disclosed in JP 2002-201028 A, is used to react a nickel salt solution, a cobalt salt solution, a manganese salt solution and a complexing agent to produce a metal composite hydroxide represented by $Ni_{(1-y-z)}Co_yMn_z$ $(OH)_2$ (wherein $0<y\leq0.4$, $0\leq z\leq0.4$).

There are no particular limitations on the nickel salt that represents the solute of the above nickel salt solution, and for example, either one salt, or two or more salts, from among nickel sulfate, nickel nitrate, nickel chloride and nickel acetate may be used. For the cobalt salt that represents the solute of the above cobalt salt solution, for example, either one salt, or two or more salts, from among cobalt sulfate, cobalt nitrate, cobalt chloride and cobalt acetate may be used. For the manganese salt that represents the solute of the above manganese salt solution, for example, either one salt, or two or more salts, from among manganese sulfate, manganese nitrate, manganese chloride and manganese acetate may be used. The above metal salts are used in proportions that correspond with the compositional ratio in the above formula $Ni_{(1-y-z)}Co_yMn_z(OH)_2$. Further, water is used as the solvent.

The complexing agent is a substance that can form complexes with the ions of nickel, cobalt and manganese in the aqueous solution, and examples include ammonium ion donors (ammonium salts such as ammonium hydroxide, ammonium sulfate, ammonium chloride, ammonium carbonate and ammonium fluoride), as well as hydrazine, ethylenediaminetetraacetic acid, nitrilotriacetic acid, uracildiacetic acid and glycine. A complexing agent need not be included, but in those cases where a complexing agent is included, the amount of the complexing agent in the mixed liquid containing the nickel salt solution, the cobalt salt solution, the manganese salt solution and the complexing agent, for example, expressed as a molar ratio relative to the total number of moles of metal salts, is greater than 0 but not more than 2.

During the precipitation, in order to adjust the pH of the aqueous solution, an alkali metal hydroxide (for example, sodium hydroxide or potassium hydroxide) may be added as necessary.

By continuously supplying the above nickel salt solution, cobalt salt solution and manganese salt solution, as well as the complexing agent, to a reaction tank, the nickel, cobalt and manganese react, producing $Ni_{(1-y-z)}Co_yMn_z(OH)_2$. During the reaction, the temperature inside the reaction tank is, for example, controlled within a range from at least 20° C. to not more than 80° C., and preferably from at least 30° C. to not more than 70° C., the pH inside the reaction tank is, for example, controlled within a range from at least pH 9 to not more than pH 13, and preferably from at least pH 11 to not more than pH 13, and the contents inside the reaction tank are stirred appropriately. The reaction tank is an overflow-type tank to enable the formed reaction precipitate to be separated.

In the production method 1, a first coprecipitation tank for producing the single particles precursor and a second coprecipitation tank for forming the secondary particles precursor are used.

By appropriately controlling the concentration of metal salts supplied to the first coprecipitation tank, the stirring speed, the reaction temperature, the reaction pH, and the firing conditions described below and the like, a single particles precursor can be produced.

Specifically, the temperature inside the tank is, for example, preferably controlled within a range from at least 30° C. to not more than 80° C., and more preferably from at least 40° C. to not more than 70° C., and is even more preferably within a range of ±20° C. relative to the temperature of the second reaction tank described below. Further, the pH value inside the reaction tank is, for example, preferably controlled within a range from at least pH 10 to not more than pH 13, and more preferably from at least pH 11 to not more than pH 12.5, is even more preferably within a range of ±pH 2 relative to the pH of the second reaction tank described below, and is particularly preferably higher than the pH of the second reaction tank. In this description, pH values are defined as being the value measured when the temperature of the aqueous solution is 40° C.

Further, by appropriately controlling the concentration of metal salts supplied to the second coprecipitation tank, the stirring speed, the reaction temperature, the reaction pH, and the firing conditions described below and the like, a secondary particles precursor can be produced.

Specifically, the temperature inside the tank is, for example, preferably controlled within a range from at least 20° C. to not more than 80° C., and more preferably from at least 30° C. to not more than 70° C., and is even more preferably within a range of ±20° C. relative to the temperature of the second reaction tank described below. Further, the pH value inside the reaction tank is, for example, preferably controlled within a range from at least pH 10 to not more than pH 13, and more preferably from at least pH 11 to not more than pH 12.5, is even more preferably within a range of ±pH 2 relative to the pH of the second reaction tank described below, and is particularly preferably lower than the pH of the second reaction tank.

In addition to the conditions described above, various gases, for example, inert gases such as nitrogen, argon or carbon dioxide, oxidizing gases such as air or oxygen, or mixed gases thereof, may also be supplied to the reaction tanks. In order to promote an oxidative state besides using a gas, a peroxide such as hydrogen peroxide, a peroxide salt such as a permanganate, a perchlorate, a hypochlorite, nitric acid, a halogen, or ozone or the like may also be used. In order to promote a reductive state besides using a gas, an organic acid such as oxalic acid or formic acid, a sulfite, or hydrazine or the like may be used.

Following the reactions described above, the obtained reaction precipitates are each washed with water and dried, and a nickel-cobalt-manganese hydroxide (the single particles precursor or secondary particles precursor) is isolated as a nickel-cobalt-manganese composite compound. Further, if necessary, the precipitates may be washed with a weak acid solution or an alkaline solution containing sodium hydroxide or potassium hydroxide.

In the above example, a nickel-cobalt-manganese composite hydroxide is produced, but a nickel-cobalt-manganese composite oxide may also be prepared.

(Lithium Metal Composite Oxide Production Step)

Following drying, the above metal composite oxide or metal composite hydroxide as the single particles precursor or secondary particles precursor is mixed with a lithium salt. When mixing the single particles precursor and the secondary particles precursor, by conducting mixing at a prescribed mass ratio, the resulting abundance ratio between the single particles and secondary particles can be roughly controlled.

In the steps following the mixing, aggregates of the single particles precursor and the secondary particles precursor respectively, secondary particles based on the isolated single particles precursor, or single particles based on the secondary particles precursor may all exist, but by adjusting the mixing ratio between the single particles precursor and the secondary particles precursor and the conditions in the steps following the mixing, the abundance ratio between the single particles and the secondary particles in the finally obtained lithium metal composite oxide can be controlled.

In the present embodiment, there are no particular limitations on the drying conditions, and for example, conditions under which a metal composite oxide or metal composite hydroxide undergoes neither oxidation nor reduction (so that an oxide is retained as an oxide, or a hydroxide is retained as a hydroxide), conditions under which a metal composite hydroxide is oxidized (with the hydroxide oxidized to an oxide), or conditions under which a metal composite oxide is reduced (with the oxide reduced to a hydroxide) may be used. In order to ensure conditions under which neither oxidation nor reduction occurs, am inert gas such as nitrogen, helium or argon may be used, whereas for conditions under which hydroxides are oxidized, oxygen or air may be used. Further, for conditions under which metal composite oxides are reduced, a reducing agent such as hydrazine or sodium sulfite may be used under a nitrogen gas atmosphere. For the lithium salt, any one of lithium carbonate, lithium nitrate, lithium acetate, lithium hydroxide, lithium hydroxide hydrate and lithium oxide, or a mixture of two or more of these salts, may be used.

Following drying of the metal composite oxide or metal composite hydroxide that functions as the single particles precursor or the secondary particles precursor, a classification may be conducted as appropriate. The lithium salt and the metal composite hydroxide described above are used with due consideration of the compositional ratio of the final target product. For example, in the case where a nickel-cobalt-manganese composite hydroxide is used, the lithium salt and the metal composite hydroxide are used in proportions that correspond with a compositional ratio represented by the formula $Li[Li_x(Ni_{(1-y-z)}Co_yMn_z)O_2$ (wherein $-0.1 \leq x \leq 0.2$, $0 < y \leq 0.4$ and $0 \leq z \leq 0.4$). By firing the mixture of the nickel-cobalt-manganese metal composite hydroxide and the lithium salt, a lithium-nickel-cobalt-manganese composite oxide is obtained. During the firing, dry air, an oxygen atmosphere or an inert gas environment or the like is used in accordance with the desired composition, and if necessary, a plurality of heating steps may be conducted.

By adjusting the holding temperature used in the firing, the average particle size of the single particles and the average particle size of the secondary particles in the obtained lithium metal composite oxide can be controlled to values that fall within the preferred ranges for an embodiment of the present invention.

The holding temperature used in the firing may be adjusted as appropriate in accordance with the type of transition metal elements used and the precipitant. Here, the holding temperature means the temperature of the atmosphere inside the firing furnace, and is the maximum temperature for the holding temperature during the firing step. Specifically, the holding temperature may be within a range from at least 200° C. to not more than 1,150° C., and is preferably at least 300° C. but not more than 1,050° C., and more preferably at least 500° C. but not more than 1,000° C.

Further, the time for which the temperature is held at the holding temperature is typically at least 0.1 hours but not more than 20 hours, and is preferably at least 0.5 hours but not more than 10 hours. The rate of temperature increase until the holding temperature is reached is typically at least 50° C./hour but not more than 400° C./hour, and the rate of cooling from the holding temperature down to room temperature is typically at least 10° C./hour but not more than 400° C./hour. Further, the firing atmosphere may be an open atmosphere, oxygen, nitrogen, argon, or a mixed gas of these gases.

The lithium metal composite oxide obtained upon firing may be crushed and then suitably classified to obtain a positive electrode material that can be used in a lithium secondary battery.

Production Method 2

The lithium metal composite oxide of an embodiment of the present invention can be produced by independently producing a first lithium metal composite oxide composed of single particles and a second lithium metal composite oxide composed of secondary particles, and then mixing these first and second lithium metal composite oxides.

When producing each of the first and second lithium metal composite oxides, first, a metal composite compound is prepared containing the metals other than lithium, namely, containing at least Ni, and also containing at least one optional element selected from the group consisting of Co, Mn, Fe, Cu, Ti, Mg, Al, W, B, Mo, Nb, Zn, Sn, Zr, Ga, La and V. The first lithium metal composite oxide is preferably produced by firing the metal composite compound with a suitable lithium salt and an inert flux. When producing the second lithium metal composite oxide, the metal composite compound is preferably fired with a suitable lithium salt.

The metal composite oxide is preferably a metal composite hydroxide or a metal composite oxide. One example of a method for producing the lithium metal composite oxide is described below, with the method divided into a metal composite compound production step and a lithium metal composite oxide production step.

(Metal Composite Compound Production Step)

The metal composite compound can be produced using a commonly known batch coprecipitation method or continuous coprecipitation method. This production method is described below in detail using the example of a metal composite hydroxide containing nickel, cobalt and manganese as metals.

First, the coprecipitation method, and in particular the continuous method disclosed in JP 2002-201028 A, is used to react a nickel salt solution, a cobalt salt solution, a manganese salt solution and a complexing agent to produce a metal composite hydroxide represented by $Ni_{(1-y-z)}Co_yMn_z(OH)_2$ (wherein $0<y\leq0.4$, $0<z\leq0.4$).

Descriptions relating to the nickel salt that represents the solute of the above nickel salt solution, the cobalt salt that represents the solute of the above cobalt salt solution, and the manganese salt that represents the solute of the above manganese salt solution are the same as the descriptions presented above for the production method 1. Further, water is used as the solvent.

Description relating to the complexing agent and the precipitation are the same as the descriptions presented above for the production method 1.

Following the reactions described above, the obtained reaction precipitate is washed with water and dried, and a nickel-cobalt-manganese hydroxide is isolated as a nickel-cobalt-manganese composite compound. Further, if necessary, the precipitate may be washed with a weak acid solution or an alkaline solution containing sodium hydroxide or potassium hydroxide. In the above example, a nickel-cobalt-manganese composite hydroxide is produced, but a nickel-cobalt-manganese composite oxide may also be prepared.

(Lithium Metal Composite Oxide Production Step)

Following drying, the above metal composite oxide or metal composite hydroxide is mixed with a lithium salt. Further, when producing the first lithium metal composite oxide, an inert flux is preferably also added and mixed during this mixing process.

By firing the inert flux-containing mixture containing the metal composite hydroxide or metal composite oxide, the lithium salt and the inert flux, the mixture is fired in the presence of the inert flux. By conducting firing in the presence of the inert flux, the sintering of primary particles to produce secondary particles can be inhibited. Further, the growth of single particles can be promoted.

In the present embodiment, descriptions relating to drying conditions and classification are the same as the production method 1. Further, with the exception of firing the secondary particles with the lithium salt without mixing the single particles precursor, the second lithium metal composite oxide can be produced using a similar method to the production method 1.

When producing the first lithium metal composite oxide, by conducting firing of the mixture in the presence of an inert flux, the reaction of the mixture can be accelerated. The inert flux may be left in the lithium metal composite oxide following firing, or may be removed following firing by washing with water or the like. In the present embodiment, the first lithium composite metal oxide is preferably washed using water or the like after the firing process. Furthermore, the second lithium composite metal oxide may also be washed using water or the like after the firing process.

By adjusting the holding temperature used in the firing, the average particle size of the single particles or the average particle size of the secondary particles in the obtained lithium metal composite oxide can be controlled to a value that falls within the preferred range for the present embodiment.

The holding temperature used in the firing may be adjusted as appropriate in accordance with the type of transition metal elements used, and the types and amounts of the precipitant and the inert flux.

Specifically, the holding temperature may be within a range from at least 200° C. to not more than 1,150° C., and is preferably at least 300° C. but not more than 1,050° C., and more preferably at least 500° C. but not more than 1,000° C.

In particular, when producing the first lithium metal composite oxide, it is preferable that the holding temperature is at least 30° C. higher, more preferably at least 50° C. higher, and even more preferably at least 80° C. higher, than the holding temperature for the second lithium metal composite oxide.

Further, the time for which the temperature is held at the holding temperature is typically at least 0.1 hours but not more than 20 hours, and is preferably at least 0.5 hours but not more than 10 hours. The rate of temperature increase until the holding temperature is reached is typically at least 50° C./hour but not more than 400° C./hour, and the rate of cooling from the holding temperature down to room temperature is typically at least 10° C./hour but not more than 400° C./hour. Further, the firing atmosphere may be an open atmosphere, oxygen, nitrogen, argon, or a mixed gas of these gases.

By mixing the obtained first and second lithium metal composite oxides in a prescribed ratio, the lithium metal composite oxide of the present embodiment can be obtained.

The lithium metal composite oxide obtained upon firing may be crushed and then suitably classified to obtain a positive electrode material that can be used in a lithium secondary battery.

There are no particular limitations on the types of inert flux that can be used in the present embodiment, provided the flux is resistant to reaction with the mixture during firing. In the present embodiment, examples of the inert flux include one or more materials selected from the group consisting of fluorides of at least one element (hereinafter referred to as "A") selected from the group consisting of Na, K, Rb, Cs, Ca, Mg, Sr and Ba, chlorides of A, carbonates of A, sulfates of A, nitrates of A, phosphates of A, hydroxides of A, molybdates of A and tungstates of A.

Examples of the fluorides of A include NaF (melting point: 993° C.), KF (melting point: 858° C.), RbF (melting point: 795° C.), CsF (melting point: 682° C.), $CaF_2$ (melting point: 1,402° C.), $MgF_2$ (melting point: 1,263° C.), $SrF_2$ (melting point: 1,473° C.) and $BaF_2$ (melting point: 1,355° C.).

Examples of the chlorides of A include NaCl (melting point: 801° C.), KCl (melting point: 770° C.), RbCl (melting point: 718° C.), CsCl (melting point: 645° C.), $CaCl_2$ (melting point: 782° C.), $MgCl_2$ (melting point: 714° C.), $SrCl_2$ (melting point: 857° C.) and $BaCl_2$ (melting point: 963° C.).

Examples of the carbonates of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1,497° C.) and $BaCO_3$ (melting point: 1,380° C.).

Examples of the sulfates of A include $Na_2SO_4$ (melting point: 884° C.), $K_2SO_4$ (melting point: 1,069° C.), $Rb_2SO_4$ (melting point: 1,066° C.), $Cs_2SO_4$ (melting point: 1,005°

C.), $CaSO_4$ (melting point: 1,460° C.), $MgSO_4$ (melting point: 1,137° C.), $SrSO_4$ (melting point: 1,605° C.) and $BaSO_4$ (melting point: 1,580° C.).

Examples of the nitrates of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$ (melting point: 561° C.), $Mg(NO_3)_2$, $Sr(NO_3)_2$ (melting point: 645° C.) and $Ba(NO_3)_2$ (melting point: 596° C.).

Examples of the phosphates of A include $Na_3PO_4$, $K_3PO_4$ (melting point: 1,340° C.), $Rb_3PO_4$, $Cs_3PO_4$, $Ca_3(PO_4)_2$, $Mg_3(PO_4)_2$ (melting point: 1,184° C.), $Sr_3(PO_4)_2$ (melting point: 1,727° C.) and $Ba_3(PO_4)_2$ (melting point: 1,767° C.).

Examples of the hydroxides of A include NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.) and $Ba(OH)_2$ (melting point: 853° C.).

Examples of the molybdates of A include $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1,520° C.), $MgMoO_4$ (melting point: 1,060° C.), $SrMoO_4$ (melting point: 1,040° C.) and $BaMoO_4$ (melting point: 1,460° C.).

Examples of the tungstates of A include $Na_2WO_4$ (melting point: 687° C.), $K_2WO_4$, $Rb_2WO_4$, $Cs_2WO_4$, $CaWO_4$, $MgWO_4$, $SrWO_4$ and $BaWO_4$.

In the present embodiment, two or more of these inert fluxes may also be used. In those cases where two or more fluxes are used, the melting point may sometimes decrease. Further, among these inert fluxes, in order to obtain a lithium metal composite oxide of higher crystallinity, a carbonate, sulfate or chloride of A, or a combination thereof, is preferred. Furthermore, A is preferably either one or both of sodium (Na) and potassium (K). In other words, among the materials mentioned above, particularly preferred inert fluxes include one or more fluxes selected from the group consisting of NaCl, KCl, $Na_2CO_3$, $K_2CO_3$, $Na_2SO_4$ and $K_2SO_4$.

In the present embodiment, the abundance of the inert flux during firing may be selected as appropriate. In one example, the abundance of the inert flux during firing is preferably at least 0.1 parts by mass, and more preferably 1 part by mass or greater, per 100 parts by mass of the lithium salt. Further, if necessary, another inert flux other than the inert flux described above may be used in combination with the above inert flux. Examples of this other flux include ammonium salts such as $NH_4Cl$ and $NH_4F$.

<Lithium Secondary Battery>

Next, while describing the structure of a lithium secondary battery, a positive electrode that uses a lithium secondary battery positive electrode active material that contains the positive electrode active material powder of an embodiment of the present invention, and a lithium secondary battery having this positive electrode are described.

One example of a lithium secondary battery of an embodiment of the present invention has a positive electrode and a negative electrode, a separator sandwiched between the positive electrode and the negative electrode, and an electrolyte solution disposed between the positive electrode and the negative electrode.

Figure 1B:
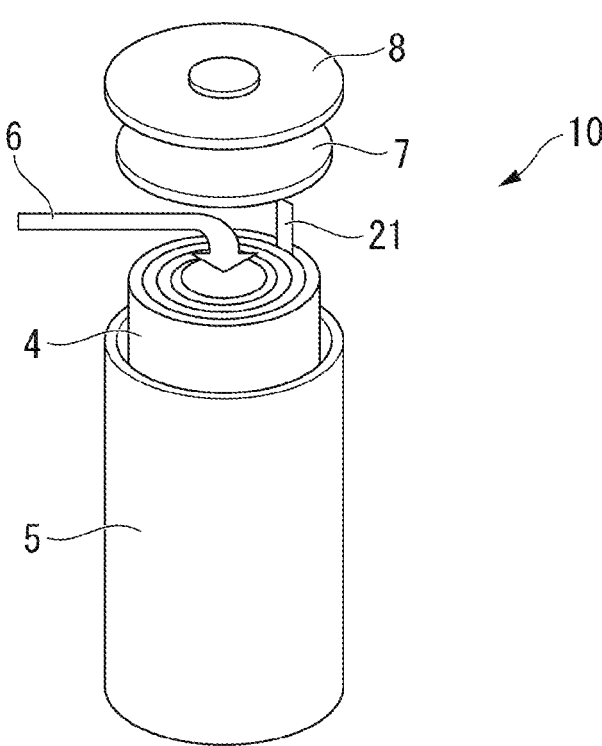
FIG. 1B is a schematic structural diagram illustrating one example of a lithium ion secondary battery.

FIG. 1A and FIG. 1B are schematic structural diagrams illustrating one example of a lithium secondary battery of an embodiment of the present invention. The circular cylindrical lithium secondary battery 10 of this embodiment is produced in the following manner.

First, as illustrated in FIG. 1A, a pair of belt-like separators 1, a belt-like positive electrode 2 having a positive electrode lead 21 at one end, and a belt-like negative electrode 3 having a negative electrode lead 31 at one end are stacked in an order: separator 1, positive electrode 2, separator 1, negative electrode 3, and the stacked structure is then wound to form an electrode group 4.

Subsequently, as illustrated in FIG. 1B, the electrode group 4 and an insulator not shown in the drawing are placed inside a battery can 5, the bottom of the can is sealed, and the electrode group 4 is immersed in an electrolyte solution 6 so that the electrolyte is disposed in the spaces between the positive electrode 2 and the negative electrode 3. By subsequently sealing the top of the battery can 5 with a top insulator 7 and a sealing body 8, a lithium secondary battery 10 can be produced.

Examples of the shape of the electrode group 4 include columnar shapes which yield a cross-sectional shape upon cutting the electrode group 4 in a direction perpendicular to the winding axis of the electrode group 4 that is, for example, circular, elliptical, rectangular, or rectangular with rounded corners.

Further, the shape of the lithium secondary battery having this type of electrode group 4 may also adopt the IEC 60086 standard for batteries prescribed by the International Electrotechnical Commission (IEC), or the shape prescribed in JIS C 8500. Examples of the shape include circular cylindrical shapes and rectangular shapes.

Moreover, the lithium secondary battery is not limited to the wound structure described above, and may also have a stacked structure in which layered structures containing a positive electrode, a separator, a negative electrode and a separator are repeatedly stacked on top of one another. Examples of stacked lithium secondary batteries include so-called coin batteries, button batteries, and paper (or sheet) batteries.

Each of the structural components is described below in order.

(Positive Electrode)

The positive electrode of the present embodiment can be produced by first preparing a positive electrode mixture containing a positive electrode active material, a conductive material and a binder, and then supporting this positive electrode mixture on a positive electrode collector.

(Conductive Material)

A carbon material can be used as the conductive material of the positive electrode of the present embodiment. Examples of the carbon material include graphite powder, carbon black (for example, acetylene black), and fibrous carbon materials. Carbon black has very fine particles and a large surface area, and therefore the conductivity inside the positive electrode can be enhanced by adding only a small amount to the positive electrode mixture, meaning the charge/discharge efficiency and the output characteristics can be improved, but if too much carbon black is added, then the binding strength between the positive electrode mixture and the positive electrode collector provided by the binder and the binding strength within the interior of the positive electrode mixture both tend to decrease, which may actually cause an increase in the internal resistance.

The proportion of the conductive material in the positive electrode mixture is preferably at least 5 parts by mass but not more than 20 parts by mass per 100 parts by mass of the positive electrode active material. In those cases where a fibrous carbon material such as graphitized carbon fiber or carbon nanotubes is used as the conductive material, this proportion may be lowered. The proportion of the positive electrode active material relative to the total mass of the positive electrode mixture is preferably from 80 to 98% by mass.

(Binder)

A thermoplastic resin can be used as the binder of the positive electrode of the present embodiment. Examples of the thermoplastic resin include fluororesins such as polyvinylidene fluoride (hereinafter sometimes referred to as PVdF), polytetrafluoroethylene (hereinafter sometimes referred to as PTFE), tetrafluoroethylene-hexafluoropropylene-vinylidene fluoride-based copolymers, hexafluoropropylene-vinylidene fluoride-based copolymers and tetrafluoroethylene-perfluoro vinyl ether-based copolymers; and polyolefin resins such as polyethylene and polypropylene.

Mixtures of two or more of these thermoplastic resins may also be used. By using a fluororesin and a polyolefin resin as the binder, and setting the proportion of the fluororesin to at least 1% by mass but not more than 10% by mass, and the proportion of the polyolefin resin to at least 0.1% by mass but not more than 2% by mass, relative to the total mass of the positive electrode mixture, a positive electrode mixture can be obtained that exhibits both superior binding strength with the positive electrode collector and superior binding strength within the interior of the positive electrode mixture.

(Positive Electrode Collector)

A belt-like member formed using a metal material such as Al, Ni or stainless steel as the forming material can be used as the positive electrode collector of the positive electrode of the present embodiment. Among the various possibilities, in terms of ease of processability and affordability, Al is preferably used as the forming material, and processed into a thin film-like form.

An example of the method used for supporting the positive electrode mixture on the positive electrode collector include a method in which the positive electrode mixture is press-molded on top of the positive electrode collector. Further, the positive electrode mixture may also be supported on the positive electrode collector by converting the positive electrode mixture to paste form using an organic solvent, coating and then drying the obtained paste of the positive electrode mixture on at least one surface of the positive electrode collector, and then fixing the paste to the collector by pressing.

Examples of organic solvents that can be used when converting the positive electrode mixture to paste form include amine-based solvents such as N,N-dimethylaminopropylamine and diethylenetriamine, ether-based solvents such as tetrahydrofuran, ketone-based solvents such as methyl ethyl ketone, ester-based solvents such as methyl acetate, and amide-based solvents such as dimethylacetamide and N-methyl-2-pyrrolidone (hereinafter sometimes referred to as NMP).

Examples of the method used for coating the paste of the positive electrode mixture onto the positive electrode collector include slit die coating methods, screen coating methods, curtain coating methods, knife coating methods, gravure coating methods and electrostatic spray methods.

By using the methods described above, the positive electrode can be produced.

(Negative Electrode)

The negative electrode of a lithium secondary battery of the present embodiment may be any material that can be doped and undoped with lithium ions at a lower potential than the positive electrode, and examples include electrodes prepared by supporting a negative electrode mixture containing a negative electrode active material on a negative electrode collector, and electrodes composed solely of a negative electrode active material.

(Negative Electrode Active Material)

Examples of the negative electrode active material of the negative electrode include carbon materials, chalcogen compounds (such as oxides and sulfides), nitrides, metals or alloys that can be doped and undoped with lithium ions at a lower potential than the positive electrode.

Examples of carbon materials that can be used as the negative electrode active material include natural graphite, other graphite such as artificial graphite, coke, carbon black, pyrolytic carbon, carbon fiber, and fired organic polymer compounds.

Examples of oxides that can be used as the negative electrode active material include oxides of silicon represented by the formula $SiO_x$ (wherein x is a positive real number) such as $SiO_2$ and SiO, oxides of titanium represented by the formula $TiO_x$ (wherein x is a positive real number) such as $TiO_2$ and TiO, oxides of vanadium represented by the formula $VO_x$ (wherein x is a positive real number) such as $V_2O_5$ and $VO_2$, oxides of iron represented by the formula $FeO_x$ (wherein x is a positive real number) such as $Fe_3O_4$, $Fe_2O_3$ and FeO, oxides of tin represented by the formula $SnO_x$ (wherein x is a positive real number) such as $SnO_2$ and SnO, oxides of tungsten represented by the general formula $WO_x$ (wherein x is a positive real number) such as $WO_3$ and $WO_2$, and composite metal oxides containing lithium and titanium or vanadium such as $Li_4Ti_5O_{12}$ and $LiVO_2$.

Examples of sulfides that can be used as the negative electrode active material include sulfides of titanium represented by the formula $TiS_x$ (wherein x is a positive real number) such as $Ti_2S_3$, $TiS_2$ and TiS, sulfides of vanadium represented by the formula $VS_x$ (wherein x is a positive real number) such as $V_3S_4$, $VS_2$ and VS, sulfides of iron represented by the formula $FeS_x$ (wherein x is a positive real number) such as $Fe_3S_4$, $FeS_2$ and FeS, sulfides of molybdenum represented by the formula $MoS_x$ (wherein x is a positive real number) such as $Mo_2S_3$ and $TiS_2$, sulfides of tin represented by the formula $SnS_x$ (wherein x is a positive real number) such as $SnS_2$ and SnS, sulfides of tungsten represented by the formula $WS_x$ (wherein x is a positive real number) such as $WS_2$, sulfides of antimony represented by the formula $SbS_x$ (wherein x is a positive real number) such as $Sb_2S_3$, and sulfides of selenium represented by the formula $SeS_x$ (wherein x is a positive real number) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A represents one or both of Ni and Co, and 0<x<3).

These carbon materials, oxides, sulfides and nitrides may be used individually, or a combination of two or more materials may be used. Further, these carbon materials, oxides, sulfides and nitrides may be either crystalline or amorphous.

Further, examples of metals that can be used as the negative electrode active material include lithium metal, silicon metal and tin metal.

Examples of alloys that can be used the negative electrode active material include lithium alloys such as Li—Al, Li—Ni, Li—Si, Li—Sn and Li—Sn—Ni, silicon alloys such as Si—Zn, tin alloys such as Sn—Mn, Sn—Co, Sn—Ni, Sn—Cu and Sn—La, and alloys such as $Cu_2Sb$ and $La_3Ni_2Sn_7$.

These metals and alloys are mainly used in standalone form as the electrode following processing into a foil-like form.

Among the negative electrode active materials described above, for reasons including almost no change in the negative electrode potential when charging from an uncharged state to a fully charged state (favorable potential flatness), a low average discharge potential, and superior volumetric capacity retention upon repeated charging and discharging (favorable cycle characteristics), carbon materials containing graphite as the main component such as natural graphite and artificial graphite can be used particularly favorably. The form of the carbon material may be any one of a flake-like form such as natural graphite, a spherical form such as mesocarbon microbeads, a fibrous form such as graphitized carbon fiber, or an aggregate of a fine powder.

The negative electrode mixture described above may include a binder if necessary. Examples of the binder include thermoplastic resins, and specific examples include PVdF, thermoplastic polyimides, carboxymethyl cellulose, polyethylene and polypropylene.

(Negative Electrode Collector)

Examples of the negative electrode collector of the negative electrode include belt-like members formed using a metal material such as Cu, Ni or stainless steel as the forming material. Among the various possibilities, in terms of being resistant to alloy formation with lithium and having good processability, Cu is preferably used as the forming material, and processed into a thin film-like form.

An example of the method used for supporting the negative electrode mixture on this type of negative electrode collector include similar methods to those described for the positive electrode, including a method using press molding, and a method in which the negative electrode mixture is converted to a paste form using a solvent or the like, coated onto the negative electrode collector, dried, and then fixed by pressing.

(Separator)

Examples of materials that may be used as the separator of the lithium secondary battery of the present embodiment include materials in the form of porous films, unwoven fabrics, or woven fabrics or the like compose of materials including polyolefin resins such as polyethylene and polypropylene, fluororesins, and nitrogen-containing aromatic polymers and the like. Further, the separator may be formed using two or more of these materials, or two or more materials may be laminated together to form the separator.

In the present embodiment, in order to ensure that the separator provides favorable permeation of the electrolyte during battery use (during charging and discharging), the air permeability determined by the Gurley method prescribed in JIS P 8117 is preferably at least 50 seconds/100 cc but not more than 300 seconds/100 cc, and is more preferably at least 50 seconds/100 cc but not more than 200 seconds/100 cc.

Further, the porosity of the separator, relative to the volume (100% by volume) of the separator, is preferably at least 30% by volume but not more than 80% by volume, and more preferably at least 40% by volume but not more than 70% by volume. The separator may also be formed by laminating separators having different porosities.

(Electrolyte Solution)

The electrolyte solution of the lithium secondary battery of the present embodiment contains an electrolyte and an organic solvent.

Examples of the electrolyte contained in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein BOB refers to bis(oxalato)borate), LiFSI (wherein FSI refers to bis(fluorosulfonyl)imide), lithium lower aliphatic carboxylates and $LiAlCl_4$, and mixtures of two or more of these salts may also be used. Among these, the use of an electrolyte containing at least one fluorine-containing salt selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ is preferred.

Further, examples of solvents that may be used as the organic solvent contained in the electrolyte solution include carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane, ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran, esters such as methyl formate, methyl acetate and γ-butyrolactone, nitriles such as acetonitrile and butyronitrile, amides such as N,N-dimethylformamide and N,N-dimethylacetamide, carbamates such as 3-methyl-2-oxazolidone, sulfur-containing compounds such as sulfolane, dimethyl sulfoxide and 1,3-propane sultone, and solvents in which an additional fluor group has been introduced into any of these organic solvents (compounds in which at one or more hydrogen atoms of the organic solvent have each been substituted with a fluorine atom).

A mixture of two or more of these organic solvents is preferably used as the organic solvent. Among the various possibilities, a mixed solvent containing a carbonate is preferred, and mixed solvents containing a cyclic carbonate and an acyclic carbonate and mixed solvents containing a cyclic carbonate and an ether are more preferred. The mixed solvent of a cyclic carbonate and an acyclic carbonate is preferably a mixed solvent containing ethylene carbonate, dimethyl carbonate and ethyl methyl carbonate. An electrolyte solution that uses this type of mixed solvent has many advantages, including having a wide operating temperature range, being resistant to degradation even when charging and discharging are conducted at a high current rate, being resistant to degradation even when used over long periods, and being less likely to decompose even when a graphite material such as natural graphite or artificial graphite is used as the negative electrode active material.

Furthermore, in order to improve the safety of the obtained lithium secondary battery, the use of an electrolyte solution containing a lithium salt that contains fluorine such as $LiPF_6$ and an organic solvent having a fluorine substituent is preferred. A mixed solvent containing dimethyl carbonate and an ether having a fluorine substituent such as pentafluoropropyl methyl ether or 2,2,3,3-tetrafluoropropyl difluoromethyl ether yields superior volumetric capacity retention even when charging and discharging are conducted at a high current rate, and is consequently particularly preferred.

A solid electrolyte may be used instead of the electrolyte solution described above. Examples of compounds that may be used as the solid electrolyte include organic-based polymer electrolytes such as polyethylene oxide-based polymer compounds, and polymer compounds containing at least one of a polyorganosiloxane chain or a polyoxyalkylene chain. Further, so-called gel-type electrolytes having a nonaqueous electrolyte solution supported on a polymer compound may also be used. Further examples include inorganic-based solid electrolytes containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$ and $Li_2S$—$GeS_2$—$P_2S_5$, and mixtures of two or more these electrolytes may also be used.

Using these solid electrolytes can sometimes further improve the safety of the lithium secondary battery.

Further, in the lithium secondary battery of the present embodiment, in those cases where a solid electrolyte is used, the solid electrolyte can sometimes also function as a separator, and in such cases, the separator may sometimes be unnecessary.

One aspect of the present invention includes the following inventions [9] to [17].

[9] A lithium metal composite oxide composed of secondary particles that are aggregates of primary particles, and single particles that exist independently from the secondary particles, wherein the lithium metal composite oxide is represented by a compositional formula (1) shown below, and satisfies requirements (A), (B) and (C) described below.

$$Li[Li_x(Ni_{(1-y-z-w)}Co_yMn_zM_w)_{1-x}]O_2 \quad (1)$$

(wherein M is at least one element selected from the group consisting of Fe, Cu, Ti, Mg, Al, W, B, Mo, Nb, Zn, Sn, Zr, Ga and V, $0.01 \leq x \leq 0.08$, $0.01 \leq y \leq 0.33$, $0.02 \leq z \leq 0.4$ and $0 \leq w \leq 0.07$)

(A) The BET specific surface area of the lithium metal composite oxide is at least 0.2 $m^2/g$ but not more than 1.5 $m^2/g$.

(B) The lithium metal composite oxide has at least two peaks in a number-based circularity distribution of the circularity determined using a formula (2) shown below.

$$Circularity = 4\pi S/L^2 \quad (2)$$

(wherein S is the projected surface area in a projected image of a particle that constitutes the powder of the metal composite oxide, and L is the circumference of the particle)

(C) The average particle size $D_{50}$ of the lithium metal composite oxide is at least 3 $\mu$m but not more than 18 $\mu$m.

[10] The lithium metal composite oxide according to [9], wherein the average circularity is at least 0.48 but not more than 0.70.

[11] The lithium metal composite oxide according to [9] or [10], wherein the circularity distribution has a first peak within a circularity range in which the circularity is at least 0.4 but not more than 0.7, and has a second peak within a circularity range in which the circularity is at least 0.75 but not more than 0.95.

[12] The lithium metal composite oxide according to [11], wherein in the circularity distribution, the circularity distribution standard deviation is at least 0.18 but not more than 0.30.

[13] The lithium metal composite oxide according to [11] or [12], wherein the first peak is a peak attributable to single particles, and the second peak is a peak attributable to secondary particles.

[14] The lithium metal composite oxide according to any one of [9] to [13], comprising single particles with an average particle size of at least 1.2 $\mu$m but not more than 4.0 $\mu$m.

[15] A positive electrode active material for a lithium secondary battery, the active material comprising the lithium metal composite oxide according to any one of [9] to [14].

[16] A positive electrode having the positive electrode active material for a lithium secondary battery according to [15].

[17] A lithium secondary battery having the positive electrode according to [16].

EXAMPLES

Next, the present invention is described in further detail using a series of examples.

<Compositional Analysis>

Compositional analysis of the lithium metal composite oxide powders produced using the methods described below was conducted by dissolving the powder of each obtained lithium composite metal compound in hydrochloric acid, and then performing an analysis using an inductively coupled plasma emission analyzer (SPS 3000, manufactured by SII NanoTechnology Inc.).

<BET Specific Surface Area Measurement>

Following drying of 1 g of the lithium metal composite oxide powder under a nitrogen atmosphere at 105° C. for 30 minutes, the BET specific surface area was measured using a BET specific surface area meter (Macsorb (a registered trademark) manufactured by Mountech Co., Ltd.).

<Measurement of Average Particle Size $D_{50}$>

First, 0.1 g of the lithium metal composite oxide powder was added to 50 ml of a 0.2% by mass aqueous solution of sodium hexametaphosphate to obtain a dispersion having the powder dispersed therein. Subsequently, using a Microtrac MT3300EXII (a laser diffraction/scattering particle size distribution analyzer) manufactured by MicrotracBEL Corporation, the particle size distribution of the obtained dispersion was measured, and a volume-based cumulative particle size distribution curve was obtained. In the obtained cumulative particle size distribution curve, when the entirety of the distribution was deemed as 100%, the value of the particle size at the point where the cumulative volume reached 50% from the small particle side was determined as the 50% cumulative volume particle size $D_{50}$ ($\mu$m).

<Measurement of Average Particle Sizes of Single Particles and Secondary Particles>

The lithium metal composite oxide powder was placed on a conductive sheet affixed to a sample stage, and using a JSM-5510 manufactured by JEOL Ltd., an electron beam with an accelerating voltage of 20 kV was irradiated onto the powder to conduct an SEM observation. The amount of the powder placed on the conductive sheet was adjusted to ensure that independent particles were not observed in an overlapping arrangement when the lithium composite metal oxide powder was placed on the conductive sheet. Fifty single particles or secondary particles were extracted randomly from the image (SEM photograph) obtained in the SEM observation, and for each single particle or secondary particle, the distance (directed diameter) between parallel lines that sandwich the projected image of the single particle or secondary particle between parallel lines drawn in a prescribed direction was measured as the particle size of the single particle or secondary particle. The arithmetic mean of the obtained particle sizes of the single particles or secondary particles was deemed the average single particle size or average secondary particle size of the lithium metal composite oxide powder.

<Measurement of Circularity>

The above SEM image was loaded into a computer, and using the image analysis software Image J, binarization processing was conducted using the mid value between the maximum brightness and the minimum brightness in the SEM image, thus obtaining a binarized image in which the lithium composite metal oxide powder, namely the single particles and secondary particles were shown in black, and portions other than the single particles or secondary particles were shown in white. Using the binarized image, the circularity of each of the black portions corresponding with a single particle or a secondary particle was measured based on the above formula (2).

[Method for Measuring Number of Peaks in Circularity Distribution]

In the circularity distribution obtained by plotting the circularity of the particles, obtained using the method described above, along the horizontal axis and the number of particles along the vertical axis, with the range from a circularity of 0 to 1.0 divided into 20 data ranges having equal intervals of 0.05, the number of locations (peaks) where the number of particles changed from an increasing trend to a decreasing trend when moving from a low circularity toward a higher circularity was measured.

[Calculation of Average Circularity]

The average circularity was calculated in the following manner.

> Average circularity in lithium composite metal oxide powder=sum of circularity values for all observed particles/total number of observed particles

[Calculation of Circularity Values at First Peak and Second Peak]

The average circularity values for the single particles and the secondary particles were calculated in the following manner.

> Average circularity for single particles=sum of circularity values for observed single particles/number of observed single particles > Average circularity for secondary particles=sum of circularity values for observed secondary particles/number of observed secondary particles The average circularity values were calculated for the single particles and the secondary particles, and the peaks were labeled as the first peak and the second peak, starting with the peak attributable to particles having a lower average circularity. In the case of two or more peaks, additional peaks are labeled in sequence as the third peak and the fourth peak and so on.

<Calculation of Circularity Distribution Standard Deviation>

The circularity distribution standard deviation was calculated from the above circularity distribution. Specifically, the standard deviation was calculated in the following manner.

In the formula below, n represents the total number of data points, and therefore means the number of particles. The average value $\bar{x}$ means the average circularity. Further, $x_i$ means the circularity of each particle.

$$s = \sqrt{s^2} = \sqrt{\frac{1}{n}\sum_{n=1}^{n}(x_i - \bar{x})^2} \qquad \text{[Mathematical formula 1]}$$

[Production of Lithium Secondary Batteries]

—Production of Positive Electrode for Lithium Secondary Battery

A positive electrode active material for lithium secondary batteries obtained using the production method described below, a conductive material (acetylene black) and a binder (PVdF) were combined and kneaded in proportions that yielded a ratio of lithium secondary battery positive electrode active material:conductive material:binder=92:5:3

(mass ratio), thus preparing a paste-like positive electrode mixture. During preparation of the positive electrode mixture N-methyl-2-pyrrolidone was used as an organic solvent.

The obtained positive electrode mixture was coated onto an Al foil of thickness 40 μm that functions as collector, dried at 60° C. for 3 hours, subsequently pressed at a linear pressure of 200 kN/m, and then subjected to vacuum drying at 150° C. for 8 hours to obtain a positive electrode for a lithium secondary battery. The electrode surface area of this positive electrode for a lithium secondary battery was 1.65 cm². Further, a mas measurement of the obtained positive electrode for a lithium secondary battery was conducted, and the density of the positive electrode mixture layer (the positive electrode density) was calculated.

—Production of Lithium Secondary Battery (Coin Cell)

The operations described below were conducted in a glovebox in a dry air environment.

The positive electrode produced above in "Production of Positive Electrode for Lithium Secondary Battery" was placed on the lower lid of a coin cell (manufactured by Hohsen Corporation) for a R2032 coin battery with the aluminum foil surface of the positive electrode facing downward, and a laminated film separator (having a heat-resistant porous layer (thickness: 16 μm) laminated on top of a polyethylene porous film) was placed on top of the positive electrode. Subsequently, 300 μL of an electrolyte solution was injected into the coin cell. The electrolyte solution that was used was prepared by dissolving 1.0 mol/L of $LiPF_6$ in a mixed solution containing ethylene carbonate, dimethyl carbonate and ethyl methyl carbonate in a ratio (volumetric ratio) of 30:35:35.

Next, using metallic lithium as the negative electrode, the negative electrode was placed on top of the laminated film separator, the top lid was installed via a gasket, and a crimping machine was used to crimp the structure to produce a lithium secondary battery (coin battery R2032, hereinafter sometimes referred to as "the coin battery").

—Charge/Discharge Tester

[Measurement of Initial Volumetric Capacity Density and Volumetric Capacity Density Retention after 50 Cycles]

Using the coin battery produced above in "Production of Lithium Secondary Battery (Coin Cell)", evaluations were conducted of the initial volumetric capacity density and the 50-cycle volumetric capacity density retention in a 50-cycle test conducted under the following conditions, with the volumetric capacity density retention after 50 cycles being calculated using the formula shown below. A higher value for the volumetric capacity density retention after 50 cycles indicates better lifespan characteristics as a battery.

> Initial Volumetric Capacity Density (mAh/cc)=Discharge Capacity on First Discharge×Positive Electrode Density > Volumetric Capacity Density after 50 Cycles (mAh/cc)=Discharge Capacity on 50th Discharge× Positive Electrode Density > Volumetric Capacity Density Retention after 50 Cycles (%)=Volumetric Capacity Density after 50 Cycles/Initial Volumetric Capacity Density× 100

In the following description, the volumetric capacity density retention after 50 cycles is sometimes referred to as the "cycle retention".

[Cycle Test Conditions]

Test temperature: 25° C.

Conditions during charging: maximum voltage during charging: 4.3 V, charging time: 6.0 hours, charging current 0.2 CA Rest time following charging: 10 minutes Conditions during discharging: minimum voltage during discharging: 2.5 V, discharge time: 6.0 hours, discharge current: 0.2 CA Rest time following discharging: 10 minutes In this test, the process of sequentially conducting charging, rest following charging, discharging and rest following discharging is deemed one cycle.

Measurement of Initial Volumetric Capacity Density

The initial volumetric capacity density was measured using the following method.

Using the positive electrode active material obtained using the method described below, a lithium secondary battery (coin cell) was produced. For the positive electrode, a positive electrode active material obtained using the method described below, a conductive material (acetylene black) and a binder (PVdF) were combined and kneaded in proportions that yielded a ratio of lithium secondary battery positive electrode active material:conductive material: binder=92:5:3 (mass ratio), thus preparing a paste-like positive electrode mixture.

Example 1

1. Production of Positive Electrode Active Material A1

A reaction tank fitted with a stirrer and an overflow pipe was charged with water, an aqueous solution of sodium hydroxide was then added, and the liquid temperature was held at 55° C.

An aqueous solution of nickel sulfate, an aqueous solution of cobalt sulfate, an aqueous solution of manganese sulfate and an aqueous solution of aluminum sulfate were mixed together so as to achieve an atomic ratio between nickel atoms, cobalt atoms, manganese atoms and aluminum atoms of 0.90:0.07:0.02:0.01, thus preparing a mixed raw material solution 1.

Next, this mixed raw material solution 1 and an aqueous solution of ammonium sulfate as a complexing agent were added continuously to the reaction tank under constant stirring. An aqueous solution of sodium hydroxide was added dropwise as appropriate to the reaction tank to adjust the pH of the solution in the reaction tank to 12.4, thus obtaining nickel-cobalt-manganese-aluminum composite hydroxide particles, and following washing, the particles were dewatered using a centrifugal separator, washed, dewatered again, isolated, and then dried at 105° C., thus obtaining a nickel-cobalt-manganese-aluminum composite hydroxide 1.

The nickel-cobalt-manganese-aluminum composite hydroxide 1, a lithium hydroxide monohydrate powder and a potassium sulfate powder were weighed and mixed so that Li/(Ni+Co+Mn+Al)=1.10 and $K_2SO_4/(LiOH+K_2SO_4)$=0.1 (mol/mol), and the mixture was then fired in an oxygen atmosphere at 840° C. for 10 hours, thus obtaining a lithium metal composite oxide powder. A slurry prepared by mixing this powder and pure water that had been adjusted to a liquid temperature of 5° C. so that the ratio of the mass of the powder to the total mass was 0.3 was stirred for 20 minutes and then dewatered, and following rinsing with an amount of pure water that had been adjusted to a liquid temperature of 5° C. that was twice the mass of the powder, the powder was isolated and dried at 150° C. to obtain a positive electrode active material A1 (containing mainly single particles).

2. Production of Positive Electrode Active Material B1

A reaction tank fitted with a stirrer and an overflow pipe was charged with water, an aqueous solution of sodium hydroxide was then added, and the liquid temperature was held at 50° C.

Next, the above mixed raw material solution 1 and an aqueous solution of ammonium sulfate as a complexing agent were added continuously to the reaction tank under constant stirring. An aqueous solution of sodium hydroxide was added dropwise as appropriate to the reaction tank to adjust the pH of the solution in the reaction tank to 11.9, thus obtaining nickel-cobalt-manganese-aluminum composite hydroxide particles, and following washing, the particles were dewatered using a centrifugal separator, washed, dewatered again, isolated, and then dried at 105° C., thus obtaining a nickel-cobalt-manganese-aluminum composite hydroxide 2.

The nickel-cobalt-manganese-aluminum composite hydroxide 2 and a lithium hydroxide monohydrate powder were weighed and mixed so that Li/(Ni+Co+Mn+Al)=1.03 (mol/mol), and the mixture was then fired in an oxygen atmosphere at 760° C. for 10 hours to obtain a positive electrode active material B1 (containing mainly secondary particles).

3. Production of Positive Electrode Active Material C1

The positive electrode active material A1 and the positive electrode active material B1 were weighed and mixed so as to achieve a mass ratio of 20:80, thus obtaining a positive electrode active material C1 that represents the positive electrode active material of Example 1.

4. Evaluation of Positive Electrode Active Material C1

The analysis results for the positive electrode active material C1 and the results of measuring the volumetric capacity density and the 50-cycle volumetric capacity density retention are shown in Table 2.

Example 2

1. Production of Positive Electrode Active Material A2

A reaction tank fitted with a stirrer and an overflow pipe was charged with water, an aqueous solution of sodium hydroxide was then added, and the liquid temperature was held at 55° C.

An aqueous solution of nickel sulfate, an aqueous solution of cobalt sulfate and an aqueous solution of manganese sulfate were mixed together so as to achieve an atomic ratio between nickel atoms, cobalt atoms and manganese atoms of 0.88:0.08:0.04, thus preparing a mixed raw material solution 2.

Next, this mixed raw material solution 2 and an aqueous solution of ammonium sulfate as a complexing agent were added continuously to the reaction tank under constant stirring. An aqueous solution of sodium hydroxide was added dropwise as appropriate to the reaction tank to adjust the pH of the solution in the reaction tank to 11.8, thus obtaining nickel-cobalt-manganese composite hydroxide particles, and following washing, the particles were dewatered using a centrifugal separator, washed, dewatered again, isolated, and then dried at 105° C., thus obtaining a nickel-cobalt-manganese composite hydroxide 3.

The nickel-cobalt-manganese composite hydroxide 3, a lithium hydroxide monohydrate powder and a potassium sulfate powder were weighed and mixed so that Li/(Ni+Co+Mn)=1.10 and $K_2SO_4/(LiOH+K_2SO_4)$=0.1 (mol/mol), and the mixture was then fired in an oxygen atmosphere at 840° C. for 10 hours, thus obtaining a lithium metal composite oxide powder. A slurry prepared by mixing this powder and pure water that had been adjusted to a liquid temperature of 5° C. so that the ratio of the mass of the powder to the total mass was 0.3 was stirred for 20 minutes and then dewatered, and following rinsing with an amount of pure water that had been adjusted to a liquid temperature of 5° C. that was twice the mass of the powder, the powder was isolated and dried at 150° C. to obtain a positive electrode active material A2 (containing mainly single particles).

2. Production of Positive Electrode Active Material B2

A reaction tank fitted with a stirrer and an overflow pipe was charged with water, an aqueous solution of sodium hydroxide was then added, and the liquid temperature was held at 45° C.

Next, the above mixed raw material solution 2 and an aqueous solution of ammonium sulfate as a complexing agent were added continuously to the reaction tank under constant stirring. An aqueous solution of sodium hydroxide was added dropwise as appropriate to the reaction tank to adjust the pH of the solution in the reaction tank to 11.5, thus obtaining nickel-cobalt-manganese composite hydroxide particles, and following washing, the particles were dewatered using a centrifugal separator, washed, dewatered again, isolated, and then dried at 105° C., thus obtaining a nickel-cobalt-manganese composite hydroxide 4.

The nickel-cobalt-manganese composite hydroxide 4 and a lithium hydroxide monohydrate powder were weighed and mixed so that Li/(Ni+Co+Mn)=1.03 (mol/mol), and the mixture was then fired in an oxygen atmosphere at 790° C. for 10 hours to obtain a positive electrode active material B2 (corresponding with secondary particles).

3. Production of Positive Electrode Active Material C2

The positive electrode active material A2 and the positive electrode active material B2 were weighed and mixed so as to achieve a mass ratio of 20:80, thus obtaining a positive electrode active material C2 that represents the positive electrode active material of Example 2.

4. Evaluation of Positive Electrode Active Material C2

The analysis results for the positive electrode active material C2 and the results of measuring the volumetric capacity density and the 50-cycle volumetric capacity density retention are shown in Table 2.

Example 3

1. Production of Positive Electrode Active Material A3

The nickel-cobalt-manganese composite hydroxide 3, a lithium hydroxide monohydrate powder and a potassium sulfate powder were weighed and mixed so that Li/(Ni+Co+Mn)=1.15 and $K_2SO_4/(LiOH+K_2SO_4)$=0.1 (mol/mol), and the mixture was then fired in an oxygen atmosphere at 840° C. for 10 hours, thus obtaining a lithium metal composite oxide powder. A slurry prepared by mixing this powder and pure water that had been adjusted to a liquid temperature of 5° C. so that the ratio of the mass of the powder to the total mass was 0.3 was stirred for 20 minutes and then dewatered, and following rinsing with an amount of pure water that had been adjusted to a liquid temperature of 5° C. that was twice the mass of the powder, the powder was isolated and dried at 150° C. to obtain a positive electrode active material A3 (containing mainly single particles).

3. Production of Positive Electrode Active Material C3

The positive electrode active material A3 and the positive electrode active material B2 were weighed and mixed so as to achieve a mass ratio of 25:75, thus obtaining a positive electrode active material C3 that represents the positive electrode active material of Example 3.

4. Evaluation of Positive Electrode Active Material C3

The analysis results for the positive electrode active material C3 and the results of measuring the volumetric capacity density and the 50-cycle volumetric capacity density retention are shown in Table 2.

Comparative Example 1

1. Production of Positive Electrode Active Material B3

A reaction tank fitted with a stirrer and an overflow pipe was charged with water, an aqueous solution of sodium hydroxide was then added, and the liquid temperature was held at 50° C.

Next, the above mixed raw material solution 2 and an aqueous solution of ammonium sulfate as a complexing agent were added continuously to the reaction tank under constant stirring. An aqueous solution of sodium hydroxide was added dropwise as appropriate to the reaction tank to adjust the pH of the solution in the reaction tank to 12.5, thus obtaining nickel-cobalt-manganese composite hydroxide particles, and following washing, the particles were dewatered using a centrifugal separator, washed, dewatered again, isolated, and then dried at 105° C., thus obtaining a nickel-cobalt-manganese composite hydroxide 5.

The nickel-cobalt-manganese composite hydroxide 5 and a lithium hydroxide monohydrate powder were weighed and mixed so that Li/(Ni+Co+Mn)=1.05 (mol/mol), and the mixture was then fired in an oxygen atmosphere at 760° C. for 10 hours to obtain a positive electrode active material B3.

2. Evaluation of Positive Electrode Active Material B3

The analysis results for the positive electrode active material B3 and the results of measuring the volumetric capacity density and the 50-cycle volumetric capacity density retention are shown in Table 1.

Comparative Example 2

1. Production of Positive Electrode Active Material C4

The positive electrode active material B2 and the positive electrode active material B3 were weighed and mixed so as to achieve a mass ratio of 80:20, thus obtaining a positive electrode active material C4.

2. Evaluation of Positive Electrode Active Material C4

The analysis results for the positive electrode active material C4 and the results of measuring the volumetric capacity density and the 50-cycle volumetric capacity density retention are shown in Table 2.

Comparative Example 3

1. Evaluation of Positive Electrode Active Material B2

The analysis results for the positive electrode active material B2 and the results of measuring the volumetric capacity density and the 50-cycle volumetric capacity density retention are shown in Table 1.

Comparative Example 4

1. Evaluation of Positive Electrode Active Material A3

The analysis results for the positive electrode active material A3 and the results of measuring the volumetric capacity density and the 50-cycle volumetric capacity density retention are shown in Table 2.

The composition, the BET specific surface area, $D_{50}$, the number of circularity distribution peaks and the average circularity values are summarized in Table 1.

The first peak circularity, the second peak circularity, the circularity distribution standard deviation, the particles attributable to the first peak, the particles attributable to the second peak, the single particles average particle size, the electrode density, the initial volumetric capacity density, and the 50-cycle volumetric capacity density retention are summarized in Table 2.

ary battery that exhibit superior volumetric capacity and volumetric capacity retention can be provided.

DESCRIPTION OF REFERENCE SIGNS

1: Separator
2: Positive electrode
3: Negative electrode
4: Electrode group
5: Battery can
6: Electrolyte solution
7: Top insulator
8: Sealing body
10: Lithium secondary battery
21: Positive electrode lead
31: Negative electrode lead

TABLE 1

| | x | y | z | w | M | BET (g/cm$^3$) | $D_{50}$ (μm) | Number of peaks in circularity distribution | Average circularity |
|---|---|---|---|---|---|---|---|---|---|
| Example 1 | 0.03 | 0.07 | 0.02 | 0.01 | Al | 1.3 | 15.2 | 2 | 0.62 |
| Example 2 | 0.02 | 0.08 | 0.04 | 0 | — | 1.4 | 11.8 | 2 | 0.55 |
| Example 3 | 0.03 | 0.08 | 0.04 | 0 | — | 0.9 | 11.9 | 2 | 0.52 |
| Comparative Example 1 | 0.03 | 0.08 | 0.04 | 0 | — | 2.1 | 5.0 | 1 | 0.50 |
| Comparative Example 2 | 0.02 | 0.08 | 0.04 | 0 | — | 1.8 | 12.8 | 1 | 0.55 |
| Comparative Example 3 | 0 | 0.08 | 0.04 | 0 | — | 1.6 | 15.9 | 1 | 0.79 |
| Comparative Example 4 | 0.02 | 0.08 | 0.04 | 0 | — | 1.1 | 3.7 | 1 | 0.58 |

TABLE 2

| | First peak circularity | Second peak circularity | Circularity distribution standard deviation | First peak origin | Second peak origin | Single particles average particle size (μm) | Electrode density (g/cc) | Initial volumetric capacity density (mAh/cc) | 50-cycle volumetric capacity density retention (%) |
|---|---|---|---|---|---|---|---|---|---|
| Example 1 | 0.61 | 0.84 | 0.20 | single particles | secondary particles | 2.8 | 3.22 | 671.8 | 91.0 |
| Example 2 | 0.65 | 0.82 | 0.20 | single particles | secondary particles | 3.2 | 3.33 | 670.2 | 83.5 |
| Example 3 | 0.59 | 0.81 | 0.24 | single particles | secondary particles | 3.8 | 3.33 | 670.2 | 83.5 |
| Comparative Example 1 | 0.50 | — | 0.18 | secondary particles | — | — | 3.13 | 641.3 | 76.1 |
| Comparative Example 2 | 0.55 | — | 0.18 | secondary particles | — | — | 3.27 | 676.7 | 81.4 |
| Comparative Example 3 | 0.79 | — | 0.11 | secondary particles | — | — | 3.18 | 660.9 | 79.7 |
| Comparative Example 4 | 0.58 | — | 0.21 | single particles | — | 3.2 | 3.12 | 606.9 | 80.5 |

As indicated by the above results, the positive electrode active materials of Examples 1 to 3 which applied the present invention were confirmed as having high volumetric capacity density and superior 50-cycle volumetric capacity density retention.

INDUSTRIAL APPLICABILITY

By using the present invention, a lithium metal composite oxide, a positive electrode active material for lithium secondary batteries, a positive electrode and a lithium second-

The invention claimed is:

1. A lithium metal composite oxide composed of secondary particles that are aggregates of primary particles, and single particles that exist independently from the secondary particles, wherein the primary particles are particles with an average particle size of less than 0.5 μm, and are particles which constitute part of secondary particles, and the single particles are particles with an average particle size of at least 1.0 μm but not more than 5.0 μm, and wherein the lithium metal composite oxide is represented by a compositional formula (1) shown below, and satisfies requirements (A), (B) and (C) described below:

$$Li[Li_x(Ni_{(1-y-z-w)}CO_yMn_zM_w)_{1-x}]O_2 \qquad (1)$$

wherein M is at least one element selected from the group consisting of Fe, Cu, Ti, Mg, Al, W, B, Mo, Nb, Zn, Sn, Zr, Ga and V, $-0.1 \leq x \leq 0.2$, $0 < y \leq 0.4$, $0 \leq z \leq 0.4$ and $0 \leq w \leq 0.1$, (A) a BET specific surface area of the lithium metal composite oxide is less than 2 $m^2/g$, (B) the lithium metal composite oxide has at least two peaks in a circularity distribution in which a circularity is determined using a formula (2) shown below:

$$Circularity = 4\pi S/L^2 \qquad (2)$$

wherein S is a projected surface area in a projected image of a particle that constitutes the lithium metal composite oxide, and L is a circumference of the particle, and (C) an average particle size $D_{50}$ of the lithium metal composite oxide is at least 2 μm but not more than 20 μm, wherein the circularity distribution is obtained by plotting the circularity along a horizontal axis and a number of particles along a vertical axis, the horizontal axis has a circularity range from 0 to 1.0 divided into 20 data ranges having equal intervals of 0.05, and each peak in the circularity distribution represents a location of the circularity, and wherein the circularity distribution has a first peak within a circularity range in which the circularity is at least 0.4 but not more than 0.7, and has a second peak within a circularity range in which the circularity is at least 0.75 but not more than 0.95.

2. The lithium metal composite oxide according to claim 1, wherein an average circularity is at least 0.4 but not more than 0.8.

3. The lithium metal composite oxide according to claim 1, wherein in the circularity distribution, a circularity distribution standard deviation is at least 0.1 but not more than 0.4.

4. The lithium metal composite oxide according to claim 1, wherein the first peak is a peak attributable to the single particles, and the second peak is a peak attributable to the secondary particles.

5. A positive electrode active material for a lithium secondary battery, the active material comprising the lithium metal composite oxide according to claim 1.

6. A positive electrode having the positive electrode active material for a lithium secondary battery according to claim 5.

7. A lithium secondary battery having the positive electrode according to claim 6.

8. A positive electrode active material for a lithium secondary battery, the active material comprising the lithium metal composite oxide according to claim 2.

9. A positive electrode having the positive electrode active material for a lithium secondary battery according to claim 8.

10. A lithium secondary battery having the positive electrode according to claim 9.

11. The lithium metal composite oxide according to claim 3, wherein the first peak is a peak attributable to the single particles, and the second peak is a peak attributable to the secondary particles.

12. The lithium metal composite oxide according to claim 1, wherein an average circularity is at least 0.45 but not more than 0.75.

* * * * *